US008773993B2

(12) United States Patent
Shojania et al.

(10) Patent No.: US 8,773,993 B2
(45) Date of Patent: Jul. 8, 2014

(54) ADAPTIVE BANDWIDTH ESTIMATION

(75) Inventors: Hassan A. Shojania, Mountain View, CA (US); Hyeonkuk Jeong, Saratoga, CA (US); Joe S. Abuan, San Jose, CA (US); Roberto Garcia, Jr., Sunnyvale, CA (US); Thomas C. Jansen, San Francisco, CA (US); James O. Normile, Los Altos, CA (US); Hsi-Jung Wu, Sunnyvale, CA (US); Yan Yang, San Jose, CA (US); Xiaosong Zhou, Campbell, CA (US)

(73) Assignee: Apple Inc., Cupertino, CA (US)

( * ) Notice: Subject to any disclaimer, the term of this patent is extended or adjusted under 35 U.S.C. 154(b) by 299 days.

(21) Appl. No.: 13/085,456

(22) Filed: Apr. 12, 2011

(65) Prior Publication Data

US 2012/0281715 A1 Nov. 8, 2012

Related U.S. Application Data

(60) Provisional application No. 61/438,254, filed on Jan. 31, 2011.

(51) Int. Cl.
*G08C 15/00* (2006.01)
(52) U.S. Cl.
USPC ........... 370/232; 709/223; 709/224; 709/225; 709/226
(58) Field of Classification Search
USPC ........... 370/465–468, 229–236; 709/223–226
See application file for complete search history.

(56) References Cited

U.S. PATENT DOCUMENTS

| | | | |
|---|---|---|---|
| 5,541,919 A | 7/1996 | Yong et al. | |
| 5,896,128 A | 4/1999 | Boyer | |
| 5,953,049 A | 9/1999 | Horn et al. | |
| 6,456,335 B1 | 9/2002 | Miura et al. | |
| 6,496,216 B2 | 12/2002 | Feder et al. | |
| 6,744,460 B1 | 6/2004 | Nimri et al. | |
| 6,757,005 B1 | 6/2004 | Elbaz et al. | |
| 7,031,281 B1 | 4/2006 | Zhang | |
| 7,266,091 B2 | 9/2007 | Singh et al. | |
| 7,362,349 B2 | 4/2008 | Nelson et al. | |
| 8,169,904 B1 * | 5/2012 | Breau et al. | 370/231 |
| 2001/0007570 A1 | 7/2001 | Mangin | |
| 2003/0026207 A1 * | 2/2003 | Loguinov | 370/235 |
| 2004/0174815 A1 | 9/2004 | Khisti et al. | |
| 2004/0213298 A1 * | 10/2004 | Sato | 370/537 |
| 2006/0133429 A1 * | 6/2006 | Seo et al. | 370/535 |
| 2007/0047574 A1 * | 3/2007 | Ling | 370/465 |
| 2008/0031149 A1 * | 2/2008 | Hughes et al. | 370/252 |
| 2008/0195745 A1 * | 8/2008 | Bowra et al. | 709/231 |

* cited by examiner

*Primary Examiner* — Mark Rinehart
*Assistant Examiner* — Mang Yeung
(74) *Attorney, Agent, or Firm* — Meyertons, Hood, Kivlin, Kowert & Goetzel, P.C.

(57) ABSTRACT

Some embodiments provide a method of combining multiple streams of data packets into a single combined stream in a manner that facilitates accurate estimation of bandwidth of a connection over a network between two devices. When combining the streams into the combined stream, the method associates a set of packets from a first stream and a reference packet from a second stream to form a longer sequence of packets in the combined stream. The method sends the combined stream from a first device to a second device so that the second device can estimate the bandwidth of the connection between the first and second devices based on the inter-arrival times of the packets in the sequence of packets.

22 Claims, 17 Drawing Sheets

ADAPTIVE BANDWIDTH ESTIMATION

CLAIM OF BENEFIT TO PRIOR APPLICATION

This Application claims the benefit of U.S. Provisional Patent Application 61/438,254, entitled "Adaptive Bandwidth Estimation," filed Jan. 31, 2011.

BACKGROUND

It is often useful to have an accurate estimation of the bandwidth of a connection between two devices that exchange data through a network (e.g., Internet). For instance, for two peers of a video/audio conferencing session, an accurate estimation of the bandwidth is essential in order to provide a high-quality user experience. If the video and audio streams generate a bitrate higher than the available bandwidth, the conference suffers from visual and audio artifacts due to packet loss. On the other hand, if the generated bitrate does not adapt itself when higher bandwidth becomes available, the video and audio quality will not be as good as they could.

The existing bandwidth estimation techniques use one or combinations of various metrics, such as packet inter-arrival time, round-trip-time ("RTT"), or packet loss rate per media stream. A common technique is based on sending a number of back-to-back packets ("packet sequence") on one side of the connection and deriving an estimation from the inter-arrival time of the received packets on the other side. However, the estimations derived by using this common technique sometimes suffer inaccuracies due to unpredictable system overhead and network buffering.

BRIEF SUMMARY

Some embodiments of the invention provide a novel method of combining multiple streams of data packets into a single combined stream in a manner that facilitates accurate estimation of bandwidth of a connection over a network between two devices. When combining the streams into the combined stream, the method associates a set of packets from a first stream and a reference packet from a second stream to form a longer sequence of packets in the combined stream. The method sends the combined stream from a first device to a second device so that the second device can estimate the bandwidth of the connection between the first and second devices based on the inter-arrival times of the packets in the sequence of packets.

In the combined stream, the reference packet precedes the set of packets in some embodiments. The second device measures the arrival times of the packets in the set relative to the time that the reference packet arrives. The second device also measures the sizes of the packets in the set. Based on the measured inter-arrival times and the sizes of the packets in the set, the second device estimates the current bandwidth of one direction of the connection (i.e., from the first device to the second device) in some embodiments. The second device sends the estimated bandwidth to the first device. The first device then adapts to the estimated bandwidth by changing its data processing in order to utilize the available bandwidth more efficiently and to provide better user experience.

When combining the first and the second streams into one stream, the method of some embodiments waits for a packet from the second stream to arrive so that the method can attach a set of packets from the first stream to the end of the packet from the second stream. The packet from the second stream is a reference packet because the packets in the set from the first stream refer to that packet's arrival time as a reference point in time from which the inter-arrival times of the packets are measured. The next set of packets from the first stream would not go into the combined stream until the next reference packet from the second stream arrives in some embodiments. In this manner, the time gap between two reference packets from the second stream is preserved in the combined stream.

Consequently, some sets of packets from the first stream is delayed a bit in order to be attached to reference packets that arrive later than the sets of packets in the first stream do in some embodiments. When set of packets from the first stream is too lengthy to preserve the time gap between two reference packets from the second stream, the method of some embodiments breaks the lengthy set of packets into subsets. In this manner, the method intersperses the reference packets among the packets in the set in the combined stream and the time gap is preserved.

In some embodiments, other combinations of sets of packets for bandwidth estimation and reference packets are utilized. In some cases, sets of packets whose arrival times and sizes are used for bandwidth estimation may be from two or more streams that are being combined. That is, in the combined stream, one set of packets can be from one stream and another set of packets can be from another stream. Each of these two sets is attached to a reference packet, which may also be selected from two or more streams in some embodiments. Further, packets within a set of packets for bandwidth estimation may be from different streams in some embodiments.

In some embodiments, not all sets of packets in the combined stream are associated with reference packets. That is, the method selects only some sets of packets to attach to reference packets when combining multiple streams into one stream. Only these sets of packets that are attached to reference packets are used for bandwidth estimation in some such embodiments.

The method of some embodiments can be used for bandwidth estimation for both directions of a connection between two devices in a network. A first device receives a combined stream from a second device and estimates the bandwidth of a connection from the second device to the first device. Conversely, the second device also receives a combined stream from the first device and estimates the bandwidth of a connection from the first device to the second device.

For some embodiments, the method can be used for more than two devices. For instance, in a video/audio conference where more than two devices exchange video, audio, and other data to conduct the conference, all devices sends combined data streams among each other and estimate bandwidths of the connections among each other. The method adjusts the conference parameters based on the bandwidth estimation received from different devices in some embodiments.

Some embodiments of the invention provide a novel method of adjusting lengths of sequences of data packets in a data stream in order to facilitate accurate estimation of bandwidth of a connection between two devices. A sequence of packets in this application refers to a set of consecutive packets in a stream of packets. In some embodiments, a first device sends a stream of packets to a second device, which in turn, upon receiving the packets generates a feedback that includes networking data that the second device generated from analyzing the packets in the incoming stream. The feedback is sent back to the first device from which the stream was originated.

Based on the feedback, the first device determines whether the lengths of the sequences in the stream that have been sent out are appropriate for accurate estimation of the current bandwidth of the connection. When the first device determines that the lengths of the sequences have not been long enough, the first device in some embodiments determines whether to increase the lengths of the sequences to send out. The first device determines this by examining the size of a piece of data that will be packetized into the next sequence to send out in some embodiments. When the size of the piece of data is not big enough to make the next sequence long enough, the first device in some embodiments examines the next piece of data to see if the sequence to be sent out after the next sequence is going to be long enough. The first process repeats examining pieces of data to be packetized into sequences for a period of time. In some embodiments, such time period is adjusted based on the feedback and the historic lengths of the sequences that have been sent out previously.

When the first device determines to increase the sizes of the sequences to send out, the first device in some cases increases the amount of data that it generates. As a result, the sequences of packets in the stream being sent out will have lengths longer than the lengths of the sequences that would have been generated without the additional data. In some embodiments, the additional data that the method of some embodiments generates is filler data, which is some arbitrary data generated solely for having more data. Using the filler data, the method of different embodiments lengthens sequences of packets differently. In some embodiments, the method generates additional packets using the filler data. The method adds these additional packets to the sequences such that the sequences are lengthened. In other embodiments, the method lengthens the individual packets in the sequence by putting some filler data in the packets.

In some embodiments, the method generates the additional data by changing the quality of data being generated. For instance, in cases when the data being generated is video data, the method uses smaller quantization parameters to perform quantization operations such that more data is resulted from quantizing the video data. The method of some embodiments may also change encoding mode so that bigger data is resulted when the video data are encoded. Using the additional data, the method of different embodiments lengthens sequences of packets differently. In some embodiments, the method generates additional packets using the additional data. The method adds these additional packets to the sequences such that the sequences are lengthened. In other embodiments, the method lengthens the individual packets in the sequence by putting the additional data in the packets.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

DETAILED DESCRIPTION

Figure 1:
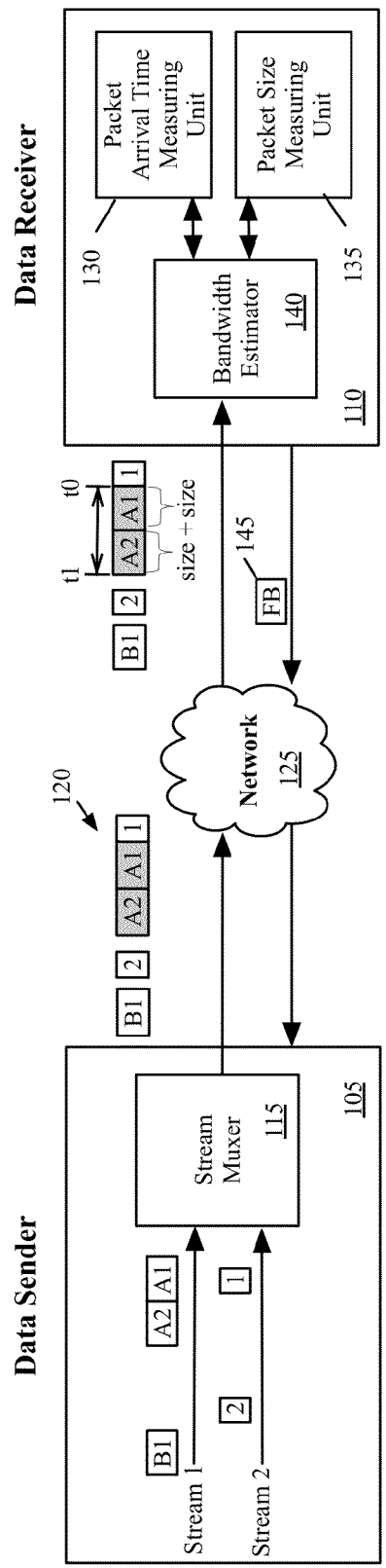
FIG. 1 conceptually illustrates combining several streams of data into one and estimating the bandwidth of a connection based on the combined stream.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a novel method of combining multiple streams of data packets into a single combined stream in a manner that facilitates accurate estimation of bandwidth of a connection over a network between two devices that are in a communication session such as a audio/video conference. A packet is a formatted unit of data that is transmitted through a packet-switched network from one device to another. Packet switching features delivery of data streams (sequences of packets) over a shared network such as the Internet. When traversing network adapters, switches, routers and other network nodes, packets are buffered and queued, resulting in variable delay and throughput depending on the traffic load in the network.

A bandwidth generally refers to the amount of data that can be transmitted through the network per unit of time. Due to buffering and queuing of the packets en route to a destination device through a packet-switched network, the bandwidth of a connection between one device to the destination device fluctuates during the communication session.

In order to provide a high quality user experience, the devices in the communication session need to adapt to the bandwidth that might be fluctuating during the communication session. For instance, if the devices generate the video and audio streams in a bitrate higher than the available bandwidth in a video conference, the conference suffers from visual and audio artifacts due to packet loss. On the other hand, if the devices do not adapt when higher bandwidth becomes available, the video and audio quality will not be as good as they could. Thus, the user experience deteriorates when the devices do not adapt to the changing bandwidth. Accordingly, getting an accurate estimation of bandwidth is essential for a device to adapt to the bandwidth.

The bandwidth is typically measured in one direction of the connection between two devices as the packets traveling in one direction may take different routes than the routes that the packets traveling in the opposite direction. A second device that receives data packets from a first device estimates the bandwidth of the connection in the direction from the first device to the second device. The first device sends back the bandwidth estimation to the second device so that the second device may adapt to the current bandwidth.

As discussed above, a common technique that is used to estimate bandwidth is based on sending a number of back-to-back packets ("packet sequence") on one side of the connection and deriving an estimation from the inter-arrival time of the received packets on the other side. To achieve high estimation quality, a device that estimates the bandwidth using this technique requires a certain packet sequence length due to unpredictable system overhead and network buffering. As will be further described below, some embodiments facilitate the formation of packet sequences with the required lengths by using packets from several streams (e.g., based on each stream's characteristics).

In some embodiments, a device that is on the sending side of the connection generates packet sequences from all available streams including audio, video, and arbitrary other data. The device in some embodiments uses small but frequent data packets from one stream (e.g., stream of audio data packets) as a first packet (i.e., the reference packet) in a packet sequence and packets from another stream (e.g., stream of video data packets) for the remainder of the sequence. In this manner, the device increases the lengths of the packet sequences being sent out.

For some embodiments of the invention, FIG. 1 conceptually illustrates that a combined stream of data packets is sent from one device to another device which estimates the bandwidth of the connection between the two devices and sends back the estimation. Specifically, this figure illustrates that a data sender 105 combines streams 1 and 2 into one stream 120 and sends the combined stream 120 to the data receiver 110 over the network 125. The figure also illustrates that a data receiver 110 receives the combined stream 120, estimates the bandwidth, and sends the bandwidth estimation in feedback 145 back to the data sender 105.

As shown in FIG. 1, the data sender 105 includes a stream muxer 115. The data sender 105 also includes streams 1 and 2 which are not part of the data sender 105 but are data streams moving along within the data sender 105 and being fed into the stream muxer 115. The data receiver 110 includes a packet arrival time measuring unit 130, a packet size measuring unit 135, and a bandwidth estimator 140. The data receiver 110 receives the combined stream 120.

The data sender 105 is a device that transmits data to another device through a connection between the two devices over a packet-switched network such as the Internet. Some examples of a data sender include a computing device such as a server, a desktop, a laptop, a netbook, a tablet computer, a smartphone, etc. that is capable of sending and receiving data to and from another device. In some embodiments, the data sender 105 generates a set of streams of data packets and combines the streams into one stream to send out to another device. For instance, the data sender 105 generates streams 1 and 2 and combines them into the combined stream 120 using the stream muxer 115 as shown.

Streams 1 and 2 are streams of different data types in some embodiments. For instance, stream 1 is a stream of video data and stream 2 is a stream of audio data. Each stream includes data packets. Stream 1 includes packets A1, A2 and B1. The stream is generated by a module (not shown for simplicity) of the data sender 105. The packets in stream 1 are grouped into different packet sequences. A packet sequence (a sequence of packets) is a set of concatenated packets (i.e., back-to-back packets). The first sequence includes packet A1 and A2, which are concatenated. The second sequence includes packet B1. The packets in each sequence in stream 1 are generated or divided from the data that represents a video frame (e.g., an I-frame, P-frame, B-frame, etc.) in some embodiments. In other words, each sequence of video packets relates to one video frame.

Stream 2 includes packets 1 and 2. This stream is also generated by a module (not shown for simplicity) of the data sender 105. The packets in stream 2 include audio samples that are digitized from an audio source such as a microphone (not shown) of the data sender 105. It is to be noted that in this figure and in any other figures in this application, the packets depicted on the right side are chronologically ahead of the packets depicted on the left side unless otherwise specified. For example, the packets in stream 1 in FIG. 1 are chronologically ordered from right to left. Thus, packet A1 is ahead of packet A2, which is ahead of packet B1 in stream 1.

The stream muxer 115 combines (i.e., multiplexes) data streams into a single combined stream in some embodiments. The stream muxer 115 in some embodiments orders and associates the packets in the combined stream in such a way that the data receiver that receives the combined stream can estimate the bandwidth of the connection accurately. The stream muxer 115 receives from other modules (not shown) of the data sender 105 data streams of different data types and combines the streams into a single combined stream of data packets.

In the combined stream, the stream muxer 115 in some embodiments associates a set of packets from a first stream with a packet from a second stream. The packet from the second stream is a reference packet and the packets in the set from the first stream refer to the reference packet as a reference point in time when bandwidth is estimated by the data receiver 110. As will be described further below, the data receiver 110 computes the inter-arrival times of the packets in the set from the first stream based on the arrival time of the reference packet from the second stream in some embodiments.

To associate the packets, the stream muxer 115 in some embodiments concatenates the reference packet with the set of packets. For instance, as shown in FIG. 1, packet 1 from stream 2 is concatenated with packets A1 and A2 from stream 1 as the stream muxer 115 combines the two streams into the combined stream 120. Instead of or in conjunction with concatenating data packets, the stream muxer 115 in other embodiments associates the packets by inserting into the first packet of the set some information that indicates the packets in the set are associated with a reference packet that precedes them in the combined stream. As will be described below, packets in the same set have a common identifier that identifies the set to which the packets belong in some embodiments. This makes it possible to indicate that the packets in the set are associated with the reference packet by inserting the association information only into the first packet of the set. In some such embodiments, the stream muxer 115 may still insert the association information in each packet of the set being associated with the reference packet. Alternatively, the stream muxer 115 inserts some information in the reference packet so as to indicate that the packets in the set that follows the reference packet are associated with the reference packet.

As shown, packets A1 and A2 in the combined stream 120 are depicted in gray color in this figure in order to show that packets A1 and A2 are associated with packet 1. Packet 1 arrives at the stream muxer 115 after packet A1 does. However, packet 1 precedes packets A1 and A2 in the combined stream. This is because the stream muxer 115 in some embodiments waits for a next packet from stream 2 to arrive so that it can attach the set of packets A1 and A2 to the next packet from stream 2 and to preserve the time gap between two audio packets in the combined stream. As shown, the time gap between packets 1 and 2 in stream 2 is preserved in the combined stream 120.

In some embodiments, the stream muxer 115 inserts various information in the packets (e.g., in the headers of the packets) when the stream muxer combines streams into a single combined stream. The inserted information in some embodiments includes a stream identification, a packet index within the stream, a flag that indicates association of the packet with another packet, etc. The data receiver 110 uses the information to identify the stream to process and the packets in the stream to use to estimate the bandwidth. The structure of a packet in some embodiments is described in further detail below by reference to FIG. 19.

Not all sets of packets from the first stream are associated with reference packets from the second stream. In some embodiments, the stream muxer 115 associates only some of the packet sets of one stream to the reference packets from another stream. Different embodiments select a set of packets from the first stream to associate with a reference packet differently. In some embodiments, the stream muxer 115 selects a set of packets from the first stream periodically. That is, the stream muxer 115 makes a selection at regular intervals in time or at regular intervals in number of packets. For example, the stream muxer 115 can select a set of packets in every 5 seconds or in every five sets of packets.

The packets that are not associated (i.e., packets from the second stream that is not associated with any set of packets from the first stream; and the packets sets from the first stream that are not selected to be associated with reference packets from the second stream) are placed in the combined stream based on a set of rules. The set of rules in some embodiments includes placing the non-associated packets in the combined stream in the order they are received by the stream muxer 115. For instance, as shown in FIG. 1, packet 2 from stream 2 is ahead of packet B1 from the second packet set of stream 1 because these packets are not associated with any other packets and the stream muxer 115 receives packet 2 before it receives packet B1.

On the receiving end of the connection, the data receiver 110 receives the combined stream 120 and analyzes the stream in order to compute networking data regarding the connection between the data sender 105 and the data receiver 110. In some embodiments, the networking data that the data receiver 110 computes includes, among other things, bandwidth estimation. The data receiver 110 also de-multiplexes the combined stream into streams of different data types in some embodiments. The data receiver 110 is a computing device like the data sender 105.

The bandwidth estimator 140 of the data receiver 110 receives the combined stream and estimates the bandwidth. Specifically, the bandwidth estimator 140 in some embodiments uses only the sets of associated packets of the combined stream to estimate the bandwidth. As described above, a set of associated packets in the combined stream includes a reference packet from one stream and a set of non-reference packets that is associated with the reference packet from another stream in some embodiments. In this application, the sets of associated packets that are used for estimating bandwidth are referred to as "bandwidth-estimation sequences." The set of packets 1, A1, and A2 as shown is a bandwidth-estimation sequence.

The bandwidth estimator 140 estimates the bandwidth by using the packet arrival time measuring unit 130 and the packet size measuring unit 135 in some embodiments. The packet arrival time measuring unit 130 in some embodiments records the arrival time of each packet in the received stream. When a packet that includes information indicating that the first packet is associated with a reference packet received by the data receiver 110, the packet arrival time measuring unit 130 retrieves the arrival time of the reference packet. The packet arrival time measuring unit 130 computes the amount of time taken to receive the packet by taking a difference in arrival times of the packet and the reference packets in some embodiments.

As more packets that are associated with the reference packet arrives, the time measuring unit 130 in some embodiments can compute the amount of time it has taken to receive the packets using the arrival time of the reference packet as a reference point in time. For example, the time measuring unit 130 uses t0, which is the arrival time of packet 1, as a reference point in time to measure the time taken to receive packets A1 and A2. By subtracting t0 from t1, which is the arrival time of packet A2, the time measuring unit 130 computes interval 1, which is the amount of time taken to receive packets A1 and A2. In this manner, the packet arrival time measuring unit 130 computes the time to receive the non-reference packets of a bandwidth-estimation sequence.

The packet size measuring unit 135 measures the amount of data (e.g., in bytes) each packet in the received stream contains. In some embodiments, the size measuring unit 135 measures the data size, for example, by counting the number of bytes of data in the packet. The packet size measuring unit 135 sums up the sizes of data of the packets associated with the reference packet in some embodiments. This sum is the overall amount of data that the packets associated with the reference packet contain. For example, the packet size measuring unit 135 measures and adds up the sizes of packets A1 and A2, which are associated with the reference packet 1. In this manner, the packet size measuring unit 135 computes the amount of data of the non-reference packets of a bandwidth-estimation sequence.

With the computed size of the non-reference packets and the time taken to receive non-reference packets, the bandwidth estimator 140 estimates the bandwidth. The estimator 140 in some embodiments divides the size by the time in order to compute the bandwidth estimation in terms of bitrate (i.e., number of bits conveyed or received per unit of time). The data receiver 110 in some embodiments sends back to the data sender 105 a feedback which contains the computed bandwidth estimation as well as other networking data such as packet loss rate, etc.

An example operation of the data sender 105 and the data receiver 110 will now be described. The data sender 105 and the data receiver 110 establish a connection between them over the network 125 and start a communication session by exchanging data between them. The network 125 is a packet-switched network such as the Internet. The data sender 105 generates streams 1 and 2 using different types of data. Stream 1 is a stream of video data packets and stream 2 is a stream of audio data packets. Stream 1 includes two sequences of packets. The first sequence of packets includes packets A1 and A2. The second sequence of packets includes packet B1.

The stream muxer 115 combines the two streams into a combined stream 120. As the stream muxer 105 combines streams 1 and 2, the stream muxer 120 associates packets A1 and A2 from stream 1 with packet 1 from stream 2 to form a bandwidth-estimation sequence. The stream muxer 115 attaches packets A1 and A2 to packet 1 so that the bandwidth-estimation sequence includes packets 1 as the first packet followed by packets A1 and A2. The stream muxer 115 also inserts to header of packet A1 data to indicate that packets A1 and A2 are associated with packet 1 from stream 2. The stream muxer 115 does not associate packet B1 from stream 1 and packet 2 from stream 2. Packets 2 and B1 are placed in the combined stream 120 in a chronological order the packets are received by the stream muxer 115. As shown, packet 2 is ahead of packet B1 in the combined stream 120.

The data sender 105 sends the combined stream 120 to the data receiver 110 over the network 125. The network 125 is a packet-switched network. The bandwidth estimator 140 receives the combined stream 125 to estimate the bandwidth of the connection using the packet arrival time measuring unit 130 and the packet size measuring unit 135.

Packet 1 in the combined stream 120 arrives at the data receiver 110 at time t0. Time t0 then becomes the arrival time of packet 1. The data receiver 110 completes receiving packets A1 and A2 at time t1. That is, the arrival time of packet A2 is time t1. The packet arrival time measuring unit computes the time taken to receive packets A1 and A2 by subtracting the arrival time, t0, of packet 1 from the arrival time, t1, of packet A2. The packet size measuring unit 135 measures the sizes of packets A1 and A2. The packet size measuring unit 135 adds up the two sizes and the result quantifies the amount of data included in packets A1 and A2 from stream 1. To estimate the bandwidth in terms of bitrate, the bandwidth estimator 140 divides the computed size of the packets by the computed time taken to receive the packets. The bandwidth estimator includes the computed bandwidth estimation in the feedback 145. The data receiver 110 sends the feedback to the data sender 105 so that the data sender 105 can adapt to the bandwidth.

In some cases, the bandwidth-estimation sequences of a combined stream may be still too short for an accurate estimation of the bandwidth. For example, when the actual available bandwidth is relatively large compared to the sizes of the bandwidth-estimation sequences, the bandwidth estimation computed based on the relatively short bandwidth-estimation sequences may not be accurate. The time for a destination device to receive a relatively short sequence is about the same when the available bandwidth is relatively large or small. In such cases, some embodiments increase the sizes of bandwidth-estimation sequences so that the estimated bandwidth is closer to the actual available bandwidth.

Figure 2:
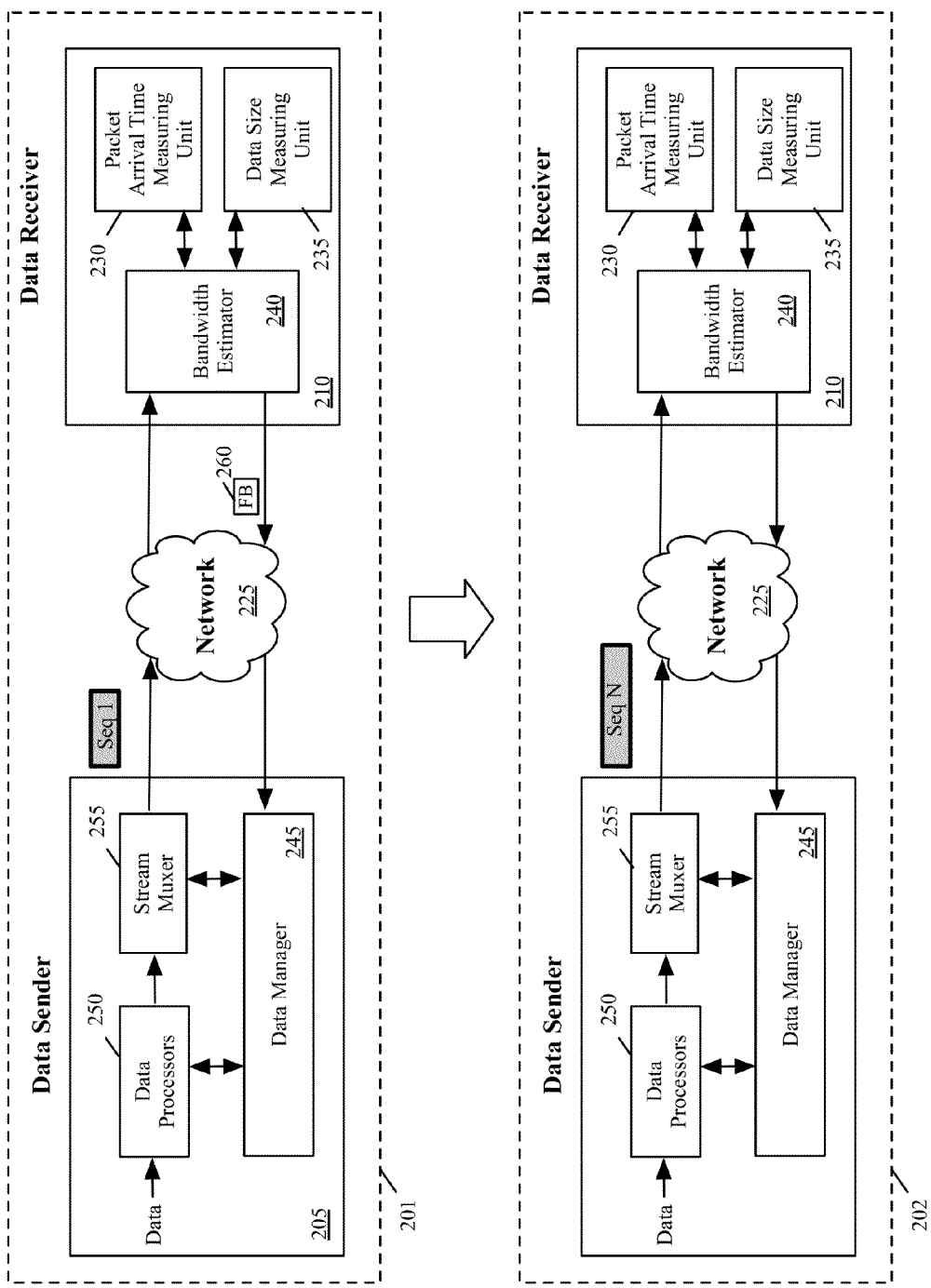
FIG. 2 conceptually illustrates increasing the size of a bandwidth-estimation sequence based on a feedback received.

FIG. 2 conceptually illustrates that a first device that sends a combined stream of data packets to a second device increases the size of a bandwidth-estimation sequence upon receiving a feedback from the second device. Specifically, this figure illustrates in two stages 201 and 202 that a data sender 205 increases the bandwidth-estimation sequences that it sends to data receiver 210 after receiving a feedback 260 that is generated by the data receiver 210. As shown, the data sender 205 comprises a data manager 245, data processors 250, and a stream muxer 255. The data receiver 210 comprises a bandwidth estimator 240, a packet arrival time measuring unit 230, and a packet size measuring unit 235.

The data receiver 210 is a device similar to the data receiver 110 described above by reference to FIG. 1. The bandwidth estimator 240, the packet arrival time measuring unit 230, and the packet size measuring unit 235 are also similar to the corresponding modules 140, 130, and 135 described above by reference to FIG. 1. The data receiver 210 sends the bandwidth estimation computed by the bandwidth estimator 240. Also, the data receiver 210 in some embodiments refines the estimation so as to produce an estimation closer to the actual bandwidth. In some embodiments, the data receiver 210 finds a value that may be closer to the actual bandwidth than the estimations computed by the bandwidth estimator 240 are by using other data regarding the connections. Those other data in some embodiments include historical data regarding current network conditions and bandwidth estimations. The data receiver 210 includes the value in the feedback to send to the data sender 205.

The data sender 205 is a device similar to the data sender 105 described above by reference to FIG. 1. The data sender 205 is a computing device capable of sending and receiving data to and from another device. Also, the data sender 205 generates a set of streams and combines the streams into a single combined stream that contains bandwidth-estimation sequences. The data sender 205 receives feedback from the data receiver 210. Based on the feedback, the data sender 205, when necessary, adjusts the lengths of the bandwidth-estimation sequences to be sent out in some embodiments.

The data manager 245 manages the data processors 250 and the stream muxer 255 to adaptively adjust data processing and stream generation operations based on the feedback it receives from the data receiver 210. The data manager 245 directs the data processors to increase or decrease the amount of data to be generated. The data manager 245 also monitors the sizes of the bandwidth-estimation sequences being sent out by the stream muxer 255. Upon receiving a feedback from the data receiver 210, the data manager 245 in some embodiments assesses the sizes of the bandwidth-estimation sequences that have been sent out and determines whether the sizes of the sequences are appropriate based on the value for the bandwidth included in the feedback.

When the data manager 245 determines that the bandwidth-estimation sequences do not have appropriate sizes compared to the value close to the actual bandwidth, the data manger directs the data processors 250 and the stream muxer 255 to adjust the sizes of the sequences to be sent out. When the bandwidth-estimation sequences are short for the actual bandwidth, the data manager 245 in some embodiments directs the data processors to generate more data by processing the data supplied to the processors differently. For instance, the data manager 245 may direct a video processor to increase the quality of the video by adjusting encoding so that more video data for each video frame is generated. The data manager 245 in some embodiments may also direct the stream muxer 255 to add filler data (e.g., some random data) to increase the size of the bandwidth-estimation sequences. When the bandwidth-estimation sequences are too long for the actual bandwidth, the data manager 245 in some embodiments directs the data processors 250 and the stream muxer 255 to reduce the sizes of the sequences to be sent out.

As will be described in detail further below, the data manager 245 in some embodiments does not immediately direct to adjust the sizes of the sequences to be sent out when the sequences have not been in appropriate sizes compared to the value close to the actual bandwidth. The manager 245 keeps monitoring the sizes of the bandwidth-estimation sequences being sent out for a period of time. When a bandwidth-estimation sequence with a size appropriate for the actual bandwidth is sent out within a certain period of time, the data manager 245 in some embodiments does not direct to adjust the sequence sizes. In some embodiments, the period of time is adjustable based on the historic sizes of the bandwidth-estimation sequences and the value close to the actual bandwidth.

The data processors 250 in some embodiments process the data supplied to the processors. The data may come from other modules (not shown) of the data sender 205. For instance, the data may include raw video data generated by a camera unit of the data sender 205 and raw audio samples from a microphone of the data sender 205. The data processors 250 in some embodiments include a video processor, an audio processor, and other processors that process other types of data. The processors 250 also generate data packets from the processed data and send streams of different data types to the stream muxer 255.

When the processors 250 generate additional data as directed by the data manager 245, the processors 250 of different embodiments generate data packets with the additional data differently. In some embodiments, the processors 250 generate all packets at a uniform size. In these embodiments, the processors 250 generate more data packets with the additional data. In other embodiments, individual packet sizes may vary and the processors 250 just increase packet sizes by inserting the additional data in the packets.

The stream muxer 255 is similar to the stream muxer 115 described above by reference to FIG. 1. In addition, the stream muxer 255 in some embodiments may add filler data to the bandwidth-estimation sequences it generates when it is directed to do so by the data manager 245. The stream muxer 255 of different embodiments handles the filler data differently. In some embodiments, the stream muxer 255 creates more data packets with the filler data and insert them as non-reference packets in the bandwidth-estimation sequences being sent out. In other embodiments, the stream muxer 255 inserts filler data into individual non-reference packets.

An example operation of the data sender 205 and the data receiver 210 will now be described. At stage 201, the data sender 205 and the data receiver 210 establish a connection between themselves over the network 225 and start a communication session by exchanging data between themselves. The network 225 is a packet-switched network such as the Internet. The data processors 250 generate streams of different data types and send them to the stream muxer 255. The stream muxer 255 combines the streams into a single combined stream. As the stream muxer 255 combines the streams received from the data processors 250, the stream muxer 255 associates packets from different streams to form a bandwidth-estimation sequence, sequence 1. The data sender 205 sends the combined stream that includes sequence 1 to the data receiver 210 through the network 225.

The bandwidth estimator 240 receives sequence 1 to estimate the bandwidth of the connection using the packet arrival time measuring unit 230 and the packet size measuring unit 235. The bandwidth estimator 240 then finds a value closer to the actual available bandwidth using a set of rules. Then the bandwidth estimator includes the computed bandwidth estimation and the number close to the actual bandwidth in the feedback 260. The data receiver 210 sends the feedback 260 to the data sender 205. When the feedback reaches the data sender 205, the data manager 245 receives the feedback.

At stage 202, the data manager 245 analyzes the feedback. The data manager 245 determines whether the sizes of the bandwidth-estimation sequences that it has been monitoring have been appropriate compared to the value close to the actual bandwidth. The data manger 245 then determines that the sequences that have been sent out are not long enough for accurately estimating the bandwidth. Based on the feedback and the historical sizes of the sequences, the data manager 245 determines the length of a time period to wait for a sequence with an appropriate size to be sent out. Such a sequence is not sent out within the time period, and the data manager 245 directs the data processors 250 to process data differently so as to generate additional data.

The processors 250 consequently generate more data. For example, a video processor of the data processors 250 changes encoding (e.g., use smaller quantization parameters) so that more data are generated for a video frame. The processors 250 then packetize the processed data and send the streams of different data types to the stream muxer 255. The stream muxer 255 combines the received streams into a combined stream. In the combined stream, the stream muxer 255 associates the packets from different streams to generate a long sequence, sequence N. The data sender 205 sends sequence N to the data receiver 210.

Several more detailed embodiments are described below. Section I provides a description of generating bandwidth-estimation sequences. Section II then describes estimating bandwidth using bandwidth-estimation sequences. Next, Section III describes adjusting lengths of bandwidth-estimation sequences when necessary. Section IV follows with a description of architecture of a device that generates and sends bandwidth-estimation sequences and architecture of a device that receives bandwidth-estimation sequences and generates feedback. Section V then describes the structure of a data packet used in some embodiments. Next, Section VI provides a description of a communication session that utilizes some embodiments of the invention. Finally, Section VII describes a computer system that implements some embodiments of the invention.

I. Generating Bandwidth-Estimation Sequences

A. Estimating Bandwidth Using Sequences of Packets

Figure 3:
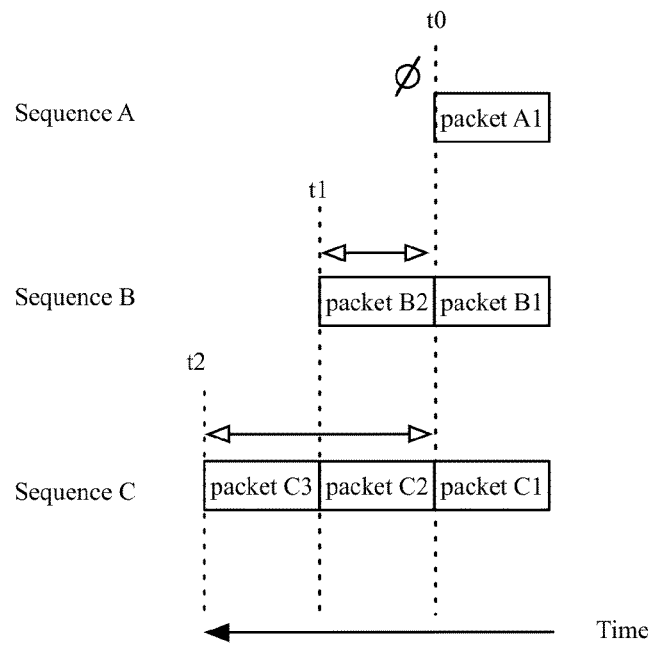
FIG. 3 illustrates computing bandwidth using a set of concatenated data packets.

FIG. 3 illustrates computing bandwidth using a set of concatenated data packets. Specifically, this figure illustrates three sequences A, B, and C with different number of packets in each sequence to show some shortcomings of measuring bandwidth using these sequences. The bandwidth of a connection between two devices (not shown) is estimated using each of the three sequences that are sent from one device to another. The device that receives these sequences estimates the bandwidth using the inter-arrival time of the packets in the sequences.

With sequence A that includes only a single packet A1, it is not possible to estimate the bandwidth. As described above, the technique based on the inter-arrival time of the packets requires a reference point in time to measure the time taken to receive the packets by the receiving device. The packet A1 does not have a reference point in time because there is no packet that precedes packet A1 in the same sequence.

The arrival time of the last packet of a previous sequence, if there is any, may not be used as a reference point in time because the last packet and packet A1 are not sent back-to-back by the sending device. That is, there is an unknown time gap between packet A1 and the last packet of the preceding sequence. This unknown time gap provides further complexities in computing the bandwidth and this is one of the reasons that the bandwidth estimation technique based on the inter-arrival time of packets uses arrival times of packets within the same sequence. The method of some embodiments, which would attach another packet in front of packet A1, can resolve some of these issues with measuring bandwidth with a single-packet sequence.

For sequence B that includes two packets B1 and B2, the time taken to receive packet B1 cannot be measured because there is no reference point in time for packet B1. The time taken to receive packet B2 can be measured by using the arrival time, t0, of packet B1 as a reference point in time. As such, the time taken to receive the whole sequence B cannot be measured and the size of packet B1 would not be used in computing the bandwidth. The method of some embodiments that will attach another packet in front of packet B1 can provide a solution to the problem with sequence B by providing a reference point in time for both packets B1 and B2. In this manner the time taken to receive the whole sequence can be measured and therefore the sizes of both packets would be used in estimating the bandwidth.

For sequence C that includes three packets C1, C2, and C3, the time taken to receive the first packet of the sequence cannot be measured because there is no reference point in time to measure the time taken to receive the first packet. This sequence is more efficient in estimating the bandwidth than sequence B because the two thirds of the sequence rather than one half of the sequence is used. Also, as more data (i.e., two packets vs. one packet assuming the packets have the same size) are used in estimating the bandwidth, the accuracy of bandwidth estimation may increase.

When the data packets are video data packets, the possibility of generating short sequences increases in low-motion situations of a video conference or for low resolution streaming by mobile devices. In low-motion situations of a video conference, less amount of data are required to construct a video frame because there are little or no variations between consecutive frames. Low resolution streaming also requires small amount of data to construct a video frame because each frame is in low resolution. As less amount of data are available, a sequence of packets for each frame includes small amount of data and consequently will be a short sequence like sequences A and B shown in FIG. 3. The method of some embodiments described above and below provides solutions to some of the problems associated with estimating bandwidths using short sequences.

B. Different Packet Combinations for Bandwidth-Estimation Sequences

As described above, the method of some embodiments combine a set of packets from one stream and a packet from another stream to make a bandwidth-estimation sequence in a combined stream. The method of different embodiments combines packets differently to generate a bandwidth-estimation sequence. FIGS. 4-8 illustrate some of the methods utilized in different embodiments.

Figure 4:
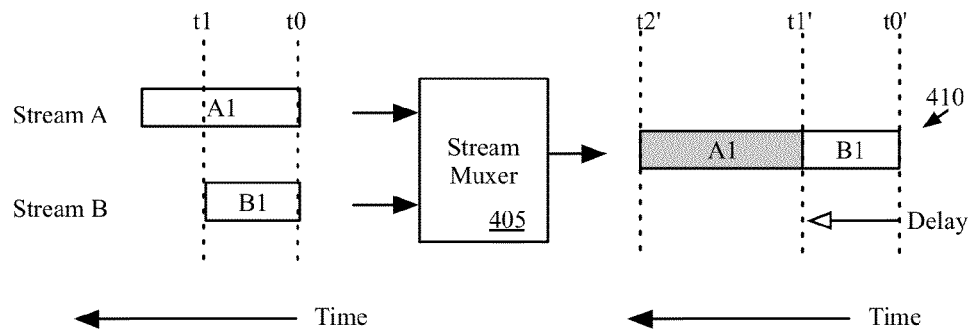
FIG. 4 conceptually illustrates combining two packets from two different streams into a bandwidth-estimation sequence of two packets.

FIG. 4 conceptually illustrates combining two packets from two different streams into a bandwidth-estimation sequence of two packets. Specifically, this figure illustrates that a stream muxer 405 concatenates packet A1 from stream A and packet B1 from stream B to form a bandwidth-estimation sequence 410 when the stream muxer 405 combines streams A and B into a combined stream 410. Other packets in the streams are not illustrated in this figure for simplicity.

The stream muxer 405 is similar to the stream muxer 115 described above by reference to FIG. 1. When combining two streams into one, the stream muxer 405 selects a set of packets or a sequence of packets from a first stream and associates the sequence with another packet from a second stream. Also, the stream muxer 405 in some embodiments waits for another packet from the second stream to arrive in some cases when there is no packet from the second stream available. In such cases, the packets in the selected sequence would be buffered and delayed before being placed in the combined stream. The packet from the second stream is not delayed when placed in the combined stream.

To associate the packet, the stream muxer 405 in some embodiments concatenate the selected sequence with the reference packet in the combined stream to form a new sequence. As described above, this new sequence of associated packets is referred to as a bandwidth-estimation sequence because the device that receives the combined stream to estimate bandwidth uses this newly formed sequence. The reference packet is the first packet of the bandwidth-estimation sequence.

When combining streams A and B, the stream muxer 405 selects the single packet sequence that includes packet A1 from stream A to associate with a reference packet B1 from stream B. Both packets arrive at the stream muxer 405 around the same time. The stream muxer 405 inserts information that indicates packet A1 is associated with packet B1 into the header of packet A1. The stream muxer 405 places the reference packet B1 ahead of the non-reference packet A1 in the combined stream. The stream muxer 405 places these packets back-to-back to form the bandwidth-estimation sequence 410. Packet A1 is buffered and delayed by a time interval from time t0' to time t1'. The placement of packet A1 is 'delayed' in a sense that it would have been placed at time t0', had it not been placed behind packet B1 to form the bandwidth-estimation sequence 410.

One of the reasons that the stream muxer 405 does not delay packet B1 from stream B is to preserve time gaps between the packets from stream B when the packets are placed in the combined stream. When stream A is a video stream and stream B is an audio stream, the affect of delaying an audio packet in the combined stream is more pronounced than the affect of delaying a video packet. This is because the audio artifacts resulted from changing time gaps is more discernable than the video artifacts resulted from changing time gaps between video packets.

Figure 5:
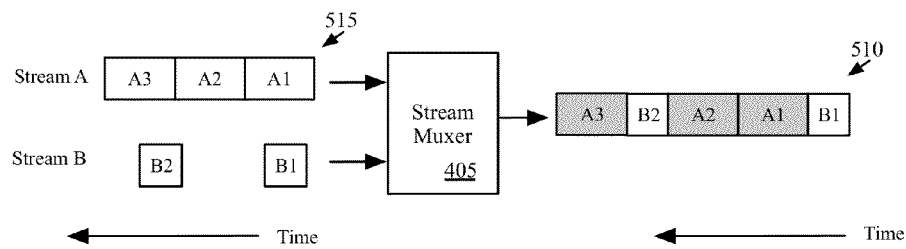
FIG. 5 conceptually illustrates combining a sequence of packets from one stream and several packets from another stream into a bandwidth-estimation sequence to have two reference packets.

FIG. 5 conceptually illustrates combining a sequence of packets from one stream and several packets from another stream into a bandwidth-estimation sequence that has two reference packets. Specifically, this figure illustrates that when the stream muxer 405 concatenates a sequence 515 of packets A1, A2, and A3 from stream A and packet B1 and B2 from stream B to form a bandwidth-estimation sequence 510, the stream muxer 405 places packet B2 between packets A2 and A3 to minimize the delay for packet B2. FIG. 5 illustrates the stream muxer 405 that is described above by reference to FIG. 4.

As described above, the stream muxer 405 in some embodiments forms a bandwidth-estimation sequence by concatenating a packet sequence from a first stream and a packet from a second stream. Also, the stream muxer 405 in some embodiments preserve time gaps between packets in the second stream when the packets are placed in the combined stream. However, when the sequence spans in time longer than the time gap between the packet and the next packet in the second stream, the stream muxer 405 places in the combined stream the next packet from the second stream between the packets of the sequence. Also, the stream muxer 405 delays the next packet from the second stream if necessary.

When combining streams A and B as illustrated in FIG. 5, the stream muxer 405 selects sequence 515 that includes packets A1, A2, and A3 from stream A to associate with a reference packet B1 from stream B. As shown, packet B1 arrives at the stream muxer 405 a little bit later than the first packet A1 of the sequence 515 does. The stream muxer 405 places packets A1, A2, and A3 after packet B1 in the combined stream 510 because packet B1 is to be the reference packet of the bandwidth-estimation sequence being formed. However, packet B2 from stream B arrives at the stream muxer 405 before the stream muxer 405 completely receives the sequence 515. The stream muxer 405 does not place B2 after the sequence 515 in the combined stream. Instead, the stream muxer 405 places packet B2 after packet A2 of the sequence 515 to minimize the delay for packet B2. The stream muxer 405 places packet A3 after packet B2. As a result, the bandwidth-estimation stream 510 has two reference packets B1 and B2 and three non-reference packets A1, A2, and A3.

The stream muxer 405 in some embodiments may associate the packets in the bandwidth-estimation sequence 510 differently. The stream muxer 405 may keep the sequence 510 as one bandwidth-estimation sequence by labeling packet B2 as a non-reference packet (e.g., by inserting such information in the header of packet B2). Alternatively, the stream muxer 405 may treat the sequence 510 as two different bandwidth-estimation sequences—one including packets B1, A1, and A2 and the other including packets B2 and A3.

Figure 6:
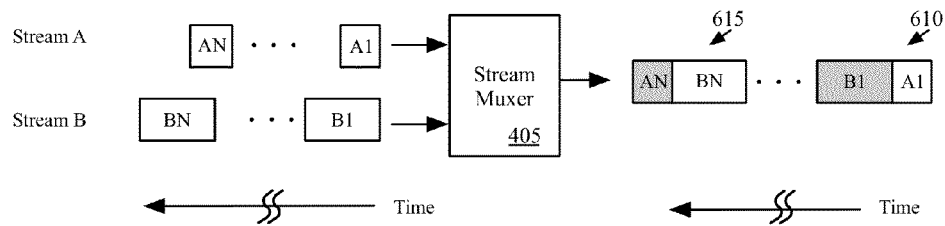
FIG. 6 conceptually illustrates generating bandwidth-estimation sequences when combining two streams of packets into one stream.

FIG. 6 conceptually illustrates that the stream muxer 405 generates bandwidth-estimation sequences when combining two streams of packets into one stream. Specifically, this figure illustrates that the stream muxer 405 in some embodiments does not have to keep using one stream as a source of reference packets and another stream as a source of non-reference packets. That is, the reference and non-reference packets may be from any of the streams.

When combining streams A and B as illustrated in FIG. 6, the stream muxer 405 selects packet B1 from stream B to associate with a reference packet from stream A. As shown, packets A1 and B1 arrive at the stream muxer 405 about the same time. The stream muxer 405 chooses packet A1 from stream A as a reference packet for a bandwidth-estimation sequence 610. The stream muxer 405 attaches packet B1 after packet A1 to form the bandwidth-estimation sequence 610. The stream muxer 405 also labels packet B1 as a non-reference packet of the bandwidth-estimation sequence 610.

At a later time, the stream muxer 405 generates another bandwidth-estimation sequence. This time, the stream muxer 405 selects packet AN from stream A to associate with a reference packet to form the bandwidth-estimation sequence. As shown, packet AN arrives at the stream muxer 405 before packet BN does. The stream muxer delays packet AN to attach it after packet BN. The stream muxer 405 labels packet AN as a non-reference packet of the bandwidth-estimation sequence 615.

Figure 7:
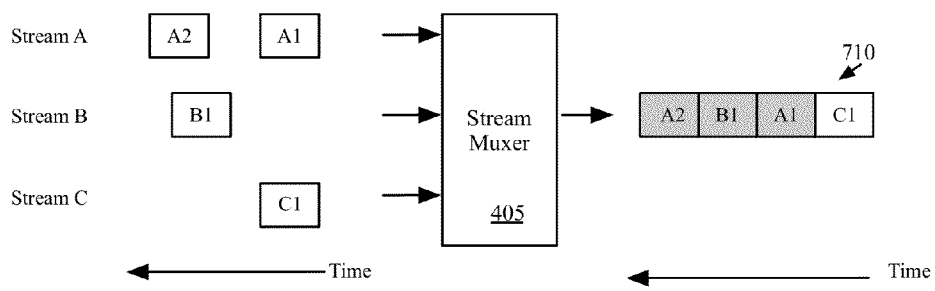
FIG. 7 conceptually illustrates generating a bandwidth-estimation sequence when combining three streams of packets into one stream.

FIG. 7 conceptually illustrates that the stream muxer 405 generates a bandwidth-estimation sequence when combining three streams of packets into one stream. Specifically, this figure illustrates that the stream muxer 405 in some embodiments uses packets from more than one stream as non-reference packets of a bandwidth-estimation sequence.

When combining streams A, B, and C as illustrated in FIG. 7, the stream muxer 405 determines that it would generate a bandwidth-estimation sequence that contains several non-reference packets from streams A and B and a reference packet from stream C. As shown, packets A1 and C1 arrive at the stream muxer 405 about the same time. The stream muxer 405 chooses packet C1 from stream C as a reference packet for a bandwidth-estimation sequence 710. The stream muxer 405 attaches packet A1 after packet C1 to form the bandwidth-estimation sequence 710. The stream muxer 405 also labels packet A1 as a non-reference packet of the bandwidth-estimation sequence 710.

Packet B1 arrives at the stream muxer after packets A1 and C1 but before packet A2. As packets B1 and A2 arrive at the stream muxer 405, the stream muxer attaches packets B1 and A2 after packet A1 in the bandwidth-estimation sequence 710 in the order the stream muxer received packets B1 and A2. The stream muxer 405 labels packet B1 and A2 as non-reference packets of the bandwidth-estimation sequence 710.

Figure 8:
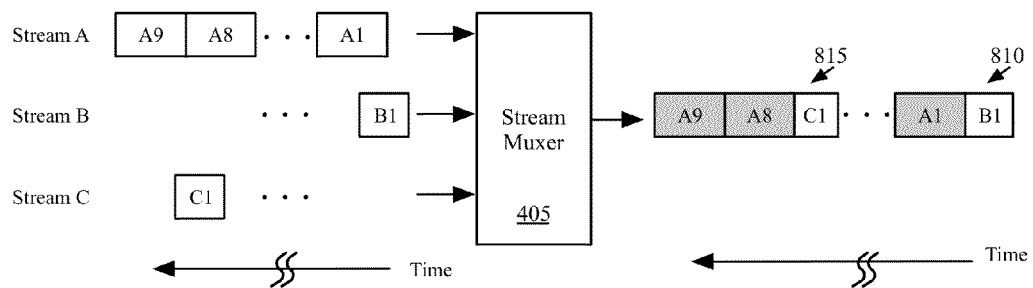
FIG. 8 conceptually illustrates generating bandwidth-estimation sequences when combining three streams of packets into one stream.

FIG. 8 conceptually illustrates that the stream muxer 405 generates two bandwidth-estimation sequences when combining three streams of packets into one stream. Specifically, this figure illustrates that the stream muxer 405 in some embodiments can use packets from more than one stream as reference packets for bandwidth-estimation sequences that it generates.

When combining streams A, B, and C as illustrated in FIG. 6, the stream muxer 405 selects packet A1 from stream A to associate with a reference packet from another stream. As shown, packet A1 arrives at the stream muxer 405 after packet B1 from stream B. As packet B1 is available for the stream muxer 405 to associate with packet A1, the stream muxer 405 associates packet A1 with packet B1 to form a bandwidth-estimation sequence 810. The stream muxer 405 chooses packet B1 as a reference packet for the bandwidth-estimation sequence 810. The stream muxer 405 also labels packet A1 as a non-reference packet of the bandwidth-estimation sequence 810.

At a later time, the stream muxer 405 generates another bandwidth-estimation sequence. This time, the stream muxer 405 selects a sequence 820 of packets A8 and A9 that arrive at the stream muxer 405 some time after packet A1. Packet C1 arrives at the stream muxer 405 about the same time as packet A8. The stream muxer associates sequence 820 with packet C1 from stream C. The stream muxer delays the sequence 820 to attach it after packet C1 in the combined stream. The stream muxer 405 labels packets A8 and A9 as non-reference packets of the bandwidth-estimation sequence 815.

C. Process to Generate Bandwidth-Estimation Sequences

Figure 9:
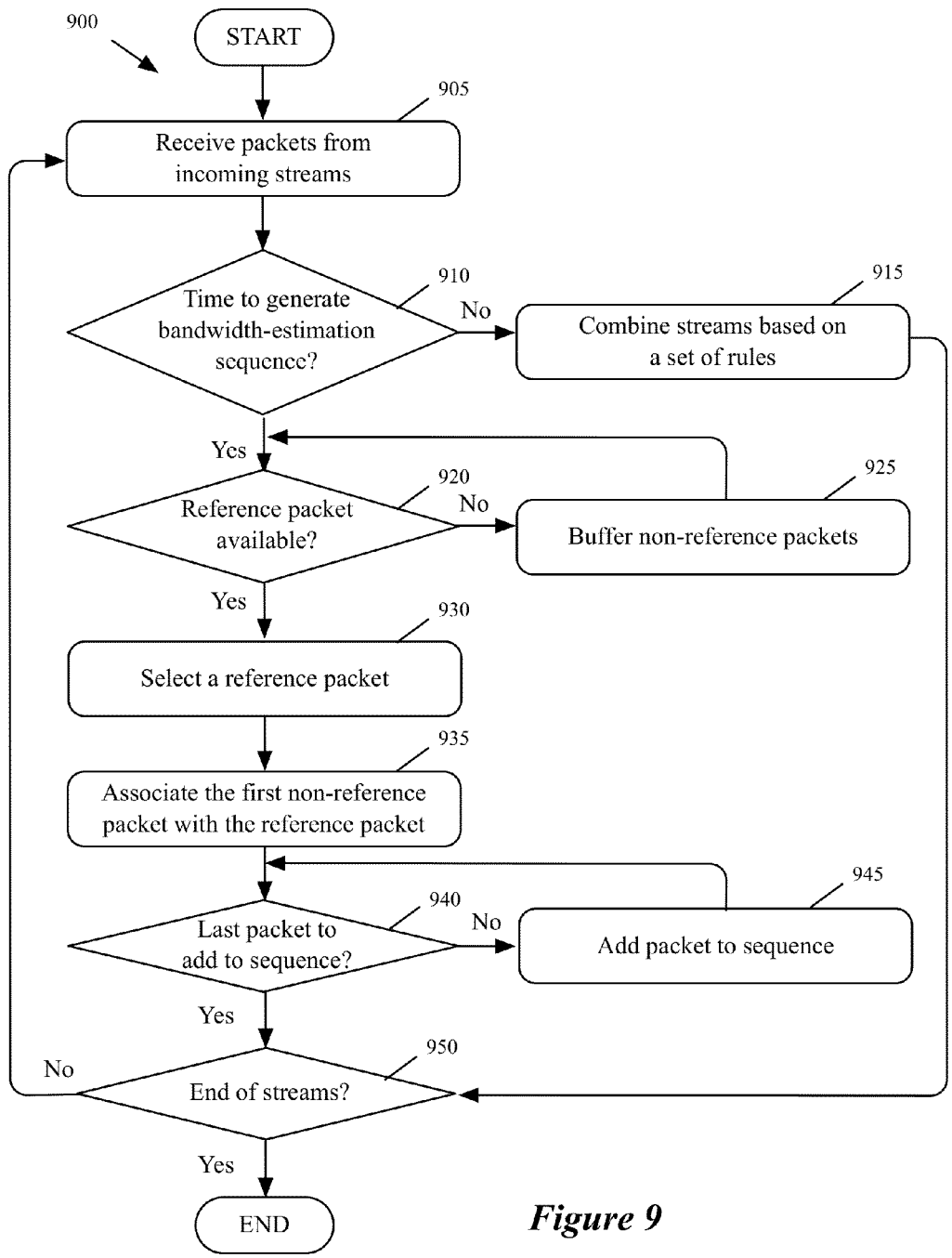
FIG. 9 illustrates a conceptual process that some embodiments perform to generate bandwidth-estimation sequences when combining several streams into one.

FIG. 9 illustrates a conceptual process 900 that some embodiments perform to generate bandwidth-estimation sequences when combining several streams into one. Process 900 is performed by a device that sends the combined stream to another device over a network. More specifically, the process in some embodiments is performed by a stream muxer such as the stream muxer 115 and the stream muxer 405 described above by reference to FIGS. 1 and 4-8. Process 900 in some embodiments starts when the devices start exchanging data with each other over the network.

Process 900 begins by receiving (at 905) packets from incoming streams. The streams are streams of data packets. There may be two or more streams coming from data processors that generate streams of different data types. Some of the incoming data streams include audio streams, video streams, and other streams of different data types.

The process then determines (at 910) whether it is time to generate a bandwidth-estimation sequence. As described above, a bandwidth-estimation sequence in some embodiments is a set of associated packets that are used for estimating bandwidth. In some embodiments, the set of associated packets are concatenated (i.e., packets that are sent back-to-back). The first packet in the bandwidth-estimation sequence is a reference packet and the rest of the packets in the sequence that follow the reference packets are non-reference packets in some embodiments. When another device receives the bandwidth-estimation sequences, the device estimates the bandwidth of a connection between the device and another device that has sent the bandwidth-estimation sequence. In some embodiments, process 900 generates bandwidth-estimation sequence periodically. For instance, the process generates bandwidth-estimation sequence every one, two, or five seconds or at any other appropriate time interval.

When the process determines (at 910) that it is not time to generate a bandwidth-estimation sequence, the process combines (at 915) the incoming streams based on a set of rules. The set of rules in some embodiments includes the process placing the packets from different streams in the combined stream in the order that it receives the packets. Another rule that may be included in the set is that the process preserves time gaps between the packets of an incoming stream when the packets are placed in the combined stream. Applying this rule may cause the process not to preserve time gaps of the packets of another incoming stream in the combined stream.

The process then proceeds to 950 to determine whether the process has reached the end of incoming streams. That is, the process determines (at 950) whether streams have stopped coming in to the process. When the process determines (at 950) that the process has reached the end of incoming streams, the process ends. Otherwise, the process loops back to 905 to receive more packets from the incoming streams.

When the process determines (at 910) that it is time to generate a bandwidth-estimation sequence, the process determines (at 920) whether there is an available packet that the process can use as a reference packet for the bandwidth-estimation sequence. As described above, a reference packet of a bandwidth-estimation sequence in some embodiments is the first packet of the sequence. The device that receives the bandwidth-estimation sequence uses the reference packet as a reference point in time to compute the time taken to receive non-reference packets in the sequence.

In some embodiments, the process selects a reference packet from a group of packets received from one or more incoming streams in a small window of time (e.g., tens of milliseconds). When there is no packet available from those incoming streams in the group, that means a reference packet is not available.

When the process determines (at 920) that there is no available packet that the process can use as a reference packet for the bandwidth-estimation sequence, the process buffers (at 925) non-reference packets. That is, the process stores the packets in the group in a buffer until a packet that could be used as a reference packet arrives. When the process determines (at 920) that there is a packet that the process can use as a reference packet of the bandwidth-estimation sequence, the process selects (at 930) the packet as the reference packet.

Process 900 then associates (at 935) the first non-reference packet with the reference packet. The first non-reference packet in some embodiments is a packet other than the reference packet that the process receives before any other packets during the small window of time. In some embodiments, the process inserts some information into the first non-reference packet (e.g., into the header of the packet) that indicates that the first non-reference packet is associated with the reference packet that precedes the non-reference packet in the combined stream. The process in some embodiments adds the packet to the bandwidth-estimation sequence by attaching the non-reference packet after the reference packet.

Next, process 900 determines (at 940) whether the first non-reference packet is the last packet to add to the bandwidth-estimation sequence. That is, the process determines whether there are more non-reference packets to add to the bandwidth-estimation sequence. Whether to add more non-reference packets to the bandwidth-estimation sequence or not depends on a predetermined number of non-reference packets to add to a bandwidth-estimation sequence. The number in some embodiments is a number of packets related to a video frame. In some such embodiments, the first packet of the related packets includes (e.g., in the header of the packet) the total number of related packets. The number of non-reference packets to add may also be determined based on the network conditions or a feedback from the device that receives the combined stream. The number is determined by a module of the device that sends out the combined stream and is provided for the process to use in some embodiments. The process selects non-reference packets to add from more than one incoming streams.

When the process determines (at 940) that the first non-reference packet is not the last non-reference packet to add to the bandwidth-estimation sequence, the process adds (at 945) the next non-reference packet to the sequence. The process in some embodiments adds the packet to the bandwidth-estimation sequence by attaching the packet to the current end of the bandwidth-estimation sequence being generated.

In some embodiments, the first non-reference packet is a first packet of a set of related packets. For instance, the packets in the set are video packets for one video frame. All packets in the set contain some data piece or flags that indicate these packets are related to each other. Because of such data piece or flags, the rest of the non-reference packets are also associated with the reference packet when the process associates the first non-reference packet with the reference packet. Nevertheless, the process in other embodiments directly associates the rest of the non-reference packets with the reference packet. In these embodiments, the process associates the next non-reference packet with the reference packet by inserting some information indicating that the packet is associated with the reference packet of the bandwidth-estimation sequence into the packet (e.g., into the header of the packet).

Once the process adds the next non-reference packet to the sequence, the process loops back to 940 to determine whether the next non-reference packet is the last packet to add to the bandwidth-estimation sequence.

When the process determines (at 940) that the packet that was just added to the bandwidth-estimation sequence is the last non-reference packet to add to the sequence, the process then determine whether the process has reached the end of incoming streams. When the process determines (at 950) that the process has reached the end of incoming streams, the process ends. Otherwise, the process loops back to 905 to receive more packets from the incoming streams.

One of ordinary skill in the art will recognize that process 900 is a conceptual representation of the operations used to generate bandwidth-estimation sequences. The specific operations of process 900 may not be performed in the exact order shown and described. The specific operations may not be performed in one continuous series of operations, and different specific operations may be performed in different embodiments. Furthermore, the process could be implemented using several sub-processes, or as part of a larger macro process. For instance, in some embodiments, process 900 may add more than one reference packets in a bandwidth-estimation sequence like the stream muxer 405 does as described above by reference to FIG. 5.

Having described generating bandwidth-estimation sequences, Section II will now describe some embodiments that estimate bandwidth based on the bandwidth-estimation sequences.

II. Estimating Bandwidth Using Bandwidth-Estimation Sequences

A first device of some embodiments generates bandwidth-estimation sequences as it combines several streams into one stream. The device sends the combined stream to a second device of some embodiments with which it has established a connection. The second device estimates the bandwidth based on the bandwidth-estimation sequences included in the combined stream.

A. Process to Compute Bandwidth Estimation

Figure 10:
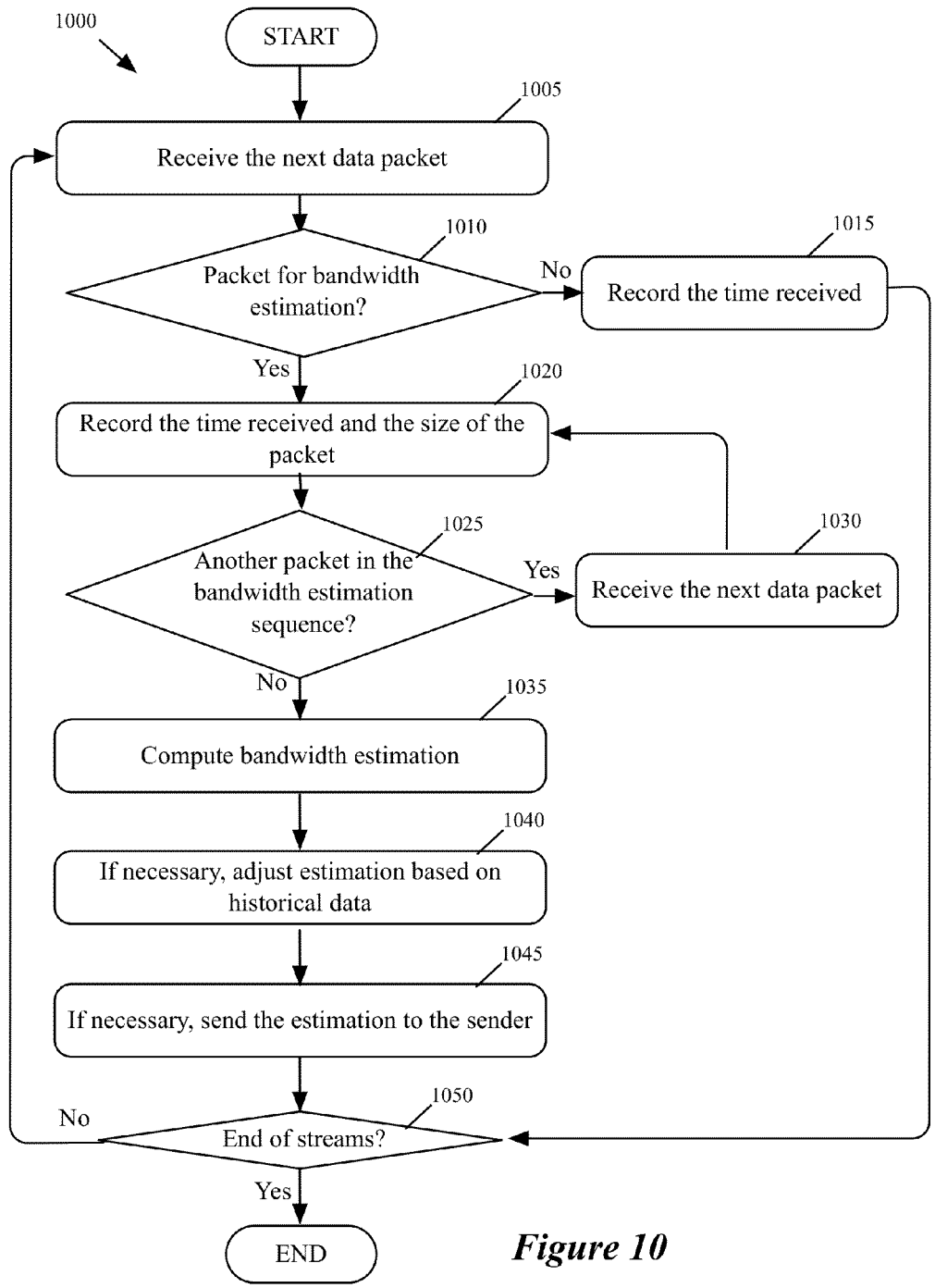
FIG. 10 illustrates a conceptual process that some embodiments perform to estimate bandwidth of a connection between two devices.

FIG. 10 illustrates a conceptual process 1000 that some embodiments perform to estimate bandwidth of a connection between two devices. Process 900 is performed by a device that receives a combined stream that includes bandwidth-estimation sequences from the device that generated and sent out the combined stream. More specifically, the process in some embodiments is performed by a bandwidth estimator such as the bandwidth estimator 140 described above by reference to FIG. 1 and a bandwidth estimator 1105 that will be described further below by reference to FIG. 11. Process 900 in some embodiments starts when the device starts receiving the combined stream.

Process 1000 begins by receiving (at 1005) the next data packet in the combined stream. The combined stream in some embodiments includes bandwidth-estimation sequences. As described above, a bandwidth-estimation sequence in some embodiments includes a reference packet as the first packet of the sequence and one or more non-reference packets following the first packet in the sequence. The details of generating a bandwidth-estimation sequence and different combinations of packets in a bandwidth-estimation sequence are described above in Section I.

The process then determines (at 1010) whether the received packet is for estimating bandwidth. That is, the process determines whether the received packet is the first non-reference packet in the bandwidth-estimation sequence in some embodiments. As described above, the reference packet in some embodiments just serves as a reference point in time and its size is not used when computing bandwidth estimation. In these embodiments, the process treats a reference packet as any packets that are not part of a bandwidth-estimation sequence.

When the process determines (at 1010) that the received packet is not for bandwidth estimation, the process records (at 1015) the time it received the packet. The time the process received the packet is the arrival time of the packet. In some embodiments, the arrival time of the packet is the time the process completes receiving the whole packet, not the time the process starts to receive the packet. When the received packet is a reference packet of a bandwidth-estimation, the recorded arrival time of the packet will serve as a reference point in time for the process to compute the amount of time taken to receive non-reference packets.

The process then proceeds to 1050 to determine whether the process has reached the end of the combined stream. That is, the process determines (at 1050) whether the stream has stopped coming in to the process. When the process determines (at 1050) that it has reached the end of the combined stream, the process ends. Otherwise, the process loops back to 1005 to receive the next packet in the combined stream.

When the process determines (at 1010) that the received packet is for bandwidth estimation, the process records (at 1020) the time the process received the packet and the size of the packet. The size of the packet in some embodiments quantifies the amount of data that is included in the packet. In some embodiments, the process measures the amount of data by counting the number of bits of data in the packet. As will be described further below, a packet includes separate header and payload data. A packet may also include several other headers for different protocol layers (e.g., an Ethernet header, a TCP header, a UDP header, etc.). Some embodiments measure the whole packet including any headers and payloads. Other embodiments selectively use the sizes of the headers when computing the size of a packet.

Next, process 1000 determines (1025) whether there is another packet in the bandwidth-estimation sequence. In some embodiments, the process determines whether there is another packet in the bandwidth-estimation sequence by examining the received packet. As described above, the non-reference packets in a bandwidth-estimation sequence are related packets in some cases and the first non-reference packet includes (e.g., in its header) the number of non-reference packets in the bandwidth-estimation sequence. When the received packet is a non-reference packet, the process in some embodiments looks at the header of the first non-reference packet to find out the number of packets related to the first non-reference packet in such cases. The process determines whether there is another non-reference packet in the bandwidth-estimation sequence based on that number.

When the process determines (at 1025) that there is another packet in the bandwidth-estimation sequence, the process receives (at 1030) the next data packet in the combined stream. The process then loops back to 1020 to record the time the process receives the next packet and the size of the next packet.

When the process determines (at 1025) that there is no more packet in the bandwidth-estimation sequence, the process computes (at 135) bandwidth estimation. The process in some embodiments estimates the bandwidth based on the time taken to receive all non-reference packets in the bandwidth-estimation sequence and the sizes of all non-reference packets. The process computes the time taken to receive all non-reference packets by subtracting the arrival time of the reference packet from the arrival time of the last non-reference packet in the bandwidth-estimation sequence. The process computes the amount of data in all non-reference packets by adding up the recorded (at 1020) sizes of the non-reference packets. The process computes bandwidth-estimation by dividing the amount of data (e.g., in number of bits) in all non-reference packets by the time taken to receive the non-reference packets.

Process 1000 adjusts (at 1040) the bandwidth estimation based on the historical data if necessary. The historical data that the process in some embodiments uses include the previous estimations computed based on previously received bandwidth-estimation sequences. The process in some embodiments adjusts the bandwidth estimation by taking an average of the bandwidth estimation computed based on the current bandwidth-estimation sequence and the previous estimations.

In some embodiments, the process compares the computed bandwidth estimation with the previous average. When the computed estimation largely deviates from the previous average, the process disregards the computed estimation. This is to prevent the device that sends the combined stream from adapting to the computed estimation that is abnormal. The process in other embodiments keeps this abnormal bandwidth estimation to see if it is part of a new trend for the future bandwidth estimations. When the computed estimation is abnormal compared to the previous average but looks to be part of a new trend set by the previously recorded abnormal estimations, the process takes a new average with these abnormal estimations and uses this average. The process then disregards the previous average.

The process then sends (at 1045) the bandwidth estimation to the sender of the combined stream if necessary. Different embodiments handle the computed estimation differently. In some embodiments, the process does not send the estimation if it is an abnormal one. In other embodiments, the process sends the previous average instead of an abnormal estimation. Some embodiments send the computed estimation without adjusting it. Other embodiments send average bandwidth estimation without adjusting it at all. As described above, the sender adapts to the bandwidth estimation once it receives it.

Process 1000 then determines (at 1050) whether the process has reached the end of the combined stream. When the process determines (at 1050) that it has reached the end of the combined stream, the process ends. Otherwise, the process loops back to 1005 to receive the next packet in the combined stream.

One of ordinary skill in the art will recognize that process 1000 is a conceptual representation of the operations used to generate bandwidth-estimation sequences. The specific operations of process 1000 may not be performed in the exact order shown and described. The specific operations may not be performed in one continuous series of operations, and different specific operations may be performed in different embodiments. Furthermore, the process could be implemented using several sub-processes, or as part of a larger macro process. For instance, process 1000 in some embodiments uses an identifier common to all non-reference packets in the bandwidth-estimation sequence to determine (at 1025) whether a received packet is part of a bandwidth-estimation sequence. This common identifier is included in each non-reference packet (e.g., in the header of the packet) of the bandwidth-estimation sequence. In these embodiments, the process computes (at 1035) bandwidth estimation when the process determines (1025) that the received packet is not part of the bandwidth-estimation sequence. The process would compute bandwidth estimation using the packets in the bandwidth-estimation sequence that preceded the currently received packet.

B. Computing Bandwidth Estimation Example

Figure 11:
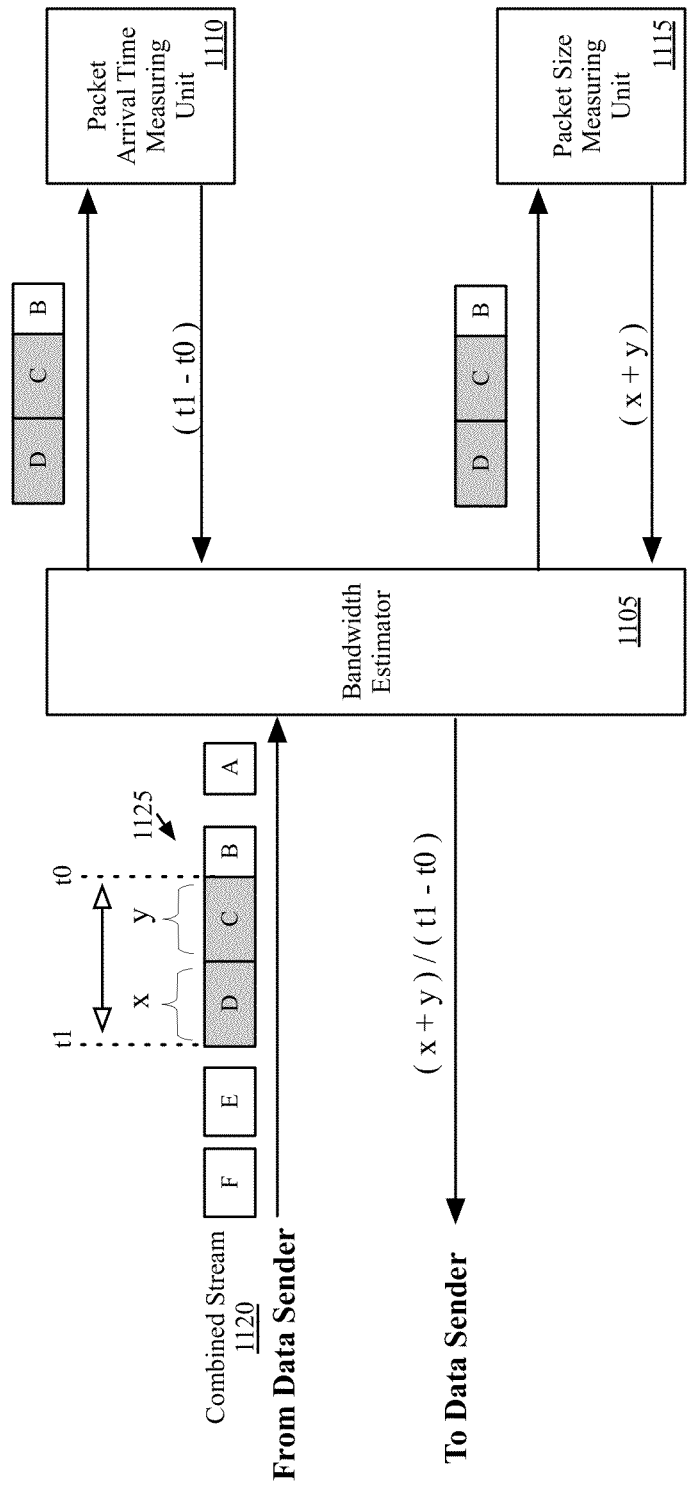
FIG. 11 conceptually illustrates computing bandwidth estimation based on a bandwidth-estimation sequence included in a combined stream of data packets.

FIG. 11 conceptually illustrates computing bandwidth estimation based on a bandwidth-estimation sequence included in a combined stream of data packets. Specifically, this figure illustrates a bandwidth estimator 1105 receives a combined stream 1120 from a sender device that generates and sends the combined stream 1120. The bandwidth estimator 1105 computes bandwidth estimation and sends it back to the sender device. As shown, FIG. 11 also illustrates a packet arrival time measuring unit 1110 and a packet size measuring unit 1115.

The bandwidth estimator 1105 is similar to the bandwidth estimator 140 described above by reference to FIG. 1. The bandwidth estimator 1105 receives a combined stream from a sender device. As the bandwidth estimator receives the combined stream, it filters out the packets that are not part of bandwidth-estimation sequences in some embodiments.

In some embodiments, the bandwidth estimator 1105 examines each packet (e.g., the header of each packet) in the combined stream. The bandwidth estimator 1105 recognizes the packets in a bandwidth-estimation sequence when the first non-reference packet arrives at the bandwidth estimator 1105. As described above, the first non-reference packet of a bandwidth-estimation sequence includes information that indicates the packet precedes the first non-reference packet is the reference packet of the bandwidth-estimation sequence in some embodiments. The first non-reference packet also includes information that identifies the rest of non-reference packets in the bandwidth-estimation sequence. All non-reference packets in the bandwidth-estimation sequence may also have a common identifier that identifies the packets as the non-reference packets of the bandwidth-estimation sequence. This common identifier is included in each non-reference packet (e.g., in the header of the packet) of the bandwidth-estimation sequence. In some cases when the reference packet or the first non-reference packet are lost in delivery, this common identifier enables the use of a non-reference packet as a substitute for the reference packet or the first non-reference packet. Based on the bandwidth-estimation sequences in the received stream, the bandwidth estimator 1105 estimates the bandwidth by using the packet arrival time measuring unit 1110 and the packet size measuring unit 1115.

The packet arrival time measuring unit 1110 records the arrival time of each packet in a bandwidth-estimation sequence that consists of a reference packet and one or more non-reference packets. The packet arrival time measuring unit 1110 computes the amount of time taken to receive all non-reference packets by taking a difference in arrival times of the reference packet and the last non-reference packet of the bandwidth-estimation sequence.

The packet size measuring unit 1115 measures the amount of data (e.g., in number of bits) each non-reference packet in the bandwidth-estimation sequence carries. In some embodiments, the size measuring unit 1115 measures the data size, for example, by counting the number of bits of data in the packet. The packet size measuring unit 1115 sums up the sizes of data of the non-reference packets. This sum is the overall amount of data that the non-reference packets in the bandwidth-estimation contain.

With the computed size of the non-reference packets and the time taken to receive non-reference packets, the bandwidth estimator 1105 estimates the bandwidth. The bandwidth-estimator 1105 divides the size by the time in order to compute the bandwidth estimation in terms of bitrate. The bandwidth estimator 1105 sends back to the sender device a feedback which contains the computed bandwidth estimation.

An example operation of the bandwidth estimator 1105 will now be described. The data sender device and the data receiver device that includes the bandwidth estimator 1105 establish a connection between them and start a communication session by exchanging data. The data sender generates the combined stream 1120 by combining several different data streams (not shown). The stream 1120 includes packets A-F. Packet A is not part of a bandwidth-estimation sequence. Packets B-D are part of a bandwidth-estimation sequence 1125. Packet B is the reference packet of the bandwidth-estimation sequence 1125. Packets C and D are non-reference packets. Packets E and F are not part of a bandwidth-estimation sequence.

The bandwidth estimator 1105 receives packets A and B and examines the content of the packets. The bandwidth estimator 1105 records the arrival times of the packets using the packet arrival time measuring unit 1110. The bandwidth estimator 1105 then receives packet C and finds out (e.g., from the header of the packet C) that packet B is the reference packet of the bandwidth-estimation sequence 1125. The bandwidth estimator 1105 also finds out that the next packet in the stream, packet D, is the last non-reference packet of the bandwidth-estimation sequence 1125. The bandwidth estimator 1105 completes receiving packet D at time t1.

Using the packet arrival time measuring unit 1110, the bandwidth estimator computes the time taken to receive the non-reference packets C and D. The packet arrival time measuring unit 1110 computes the time taken by subtracting t0 from t1. Using the packet size measuring unit 1115, the bandwidth estimator computes the amount of data that the non-reference packets C and D contain. The packet size measuring unit 1115 computes the amount by adding x and y which are the sizes of the data in the packets.

To estimate the bandwidth in terms of bitrate, the bandwidth estimator 1105 divides the computed amount of data in the non-reference packets (x+y) by the computed time taken to receive the non-reference packets (t1−t0). The bandwidth estimator 1105 then includes the computed bandwidth estimation (x+y)/(t1−t0) in the feedback it sends to the sender device. The bandwidth estimator 1105 then receives packets F and E and examines their headers. The bandwidth estimator 1105 records the arrival times of the packets using the packet arrival time measuring unit 1110.

Having described some embodiments that send feedback that includes computed bandwidth estimation back to the sender of a combined stream, Section III will now describe some embodiments that adjust lengths of bandwidth-estimation sequences based on the received feedback.

III. Adjusting Lengths of Bandwidth-Estimation Sequences

A. Process to Adjust Lengths of Bandwidth-Estimation Sequences

As described above, the bandwidth-estimation sequences of a combined stream may be too short or too long for an accurate estimation of the bandwidth. When the actual available bandwidth is relatively large compared to the sizes of the bandwidth-estimation sequences, the bandwidth estimation computed based on the relatively short bandwidth-estimation sequences may not be accurate. For instance, the time for a destination device to receive a relatively short sequence is about the same when the available bandwidth is relatively large or small.

Figure 12:
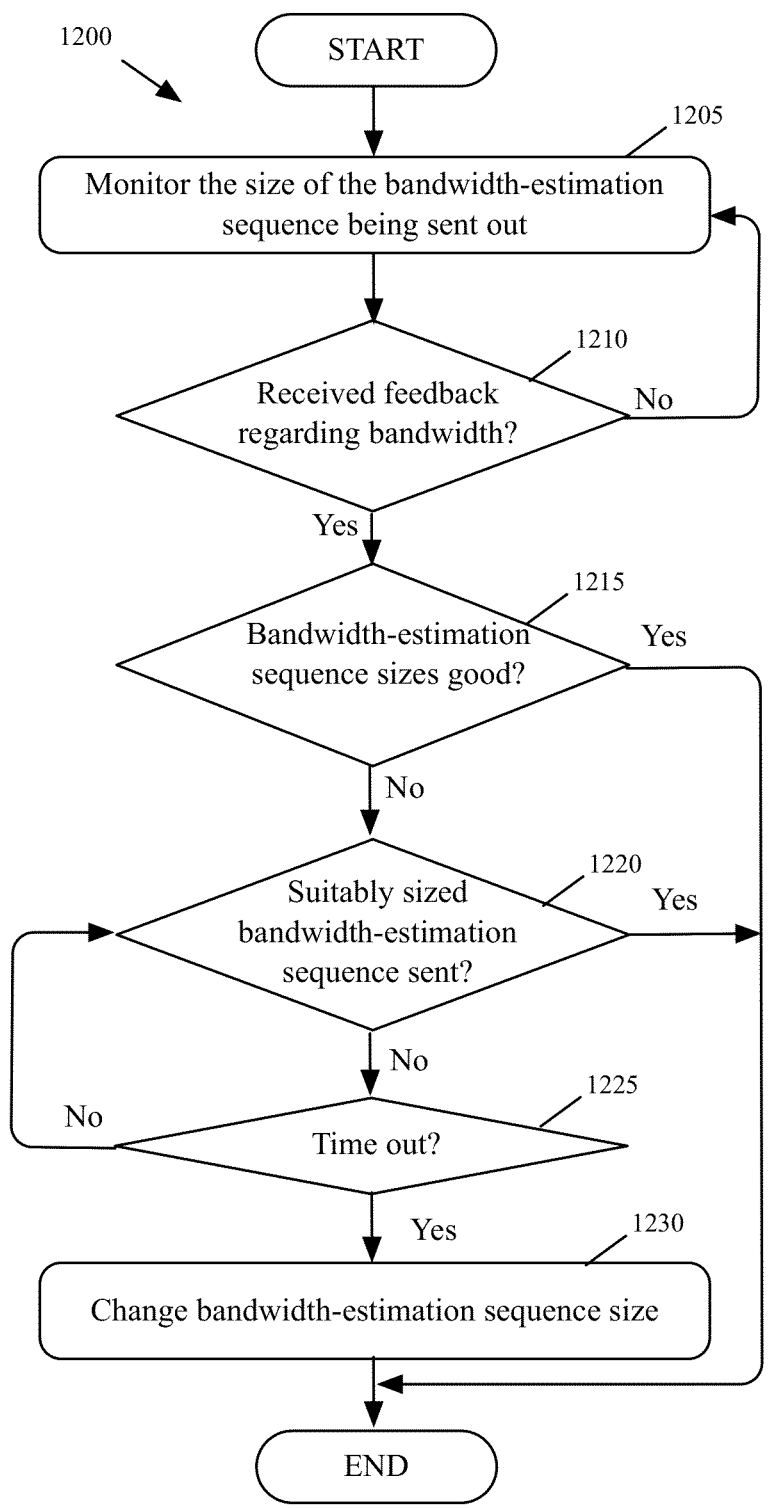
FIG. 12 illustrates a conceptual process that some embodiments perform to adjust lengths of bandwidth-estimation sequences.

FIG. 12 illustrates a conceptual process 1200 that some embodiments perform to adjust lengths of bandwidth-estimation sequences that a device sends out to another device over a connection between the devices. Process 1200 is performed by the sender device that generates bandwidth-estimation sequences in a combined stream when combining several streams into the combined stream. More specifically, the process in some embodiments is performed by a data manager of a sender device such as the data manger 245 of the data sender 205 described above by reference to FIG. 2. The sender device sends the combined stream that includes bandwidth-estimation sequences and receives back feedbacks from the device that receives the combined stream. Process 1200 in some embodiments starts when the sender and receiver devices start exchanging data or after there is a change for the sizes of bandwidth-estimation sequences.

Process 1200 begins (at 1205) by monitoring the size of the bandwidth-estimation sequence that is being sent out by the sender device. The process in some embodiments obtains the size of the bandwidth-estimation sequence from a stream muxer of the sender device that generates the bandwidth-estimation sequence. The stream muxer computes the size of the bandwidth sequence by adding up the sizes of the non-reference packets in the sequence.

Next, process 1200 determines (at 1210) whether the process has received feedback regarding the bandwidth of the connection between the sender and receiver devices from the receiver device. As described above, a feedback from a device that receives a combined stream in some embodiments includes bandwidth estimation and/or a value found to be closer to the actual bandwidth.

When the process determines (at 1210) that it has not received a feedback, the process loops back to 1205 to monitor the size of the next bandwidth-estimation being sent out by the sender device. Otherwise, the process determines (at 1215) whether the sizes of the bandwidth-estimation sequences that have been sent out so far are good based on the received feedback. The process determines whether the sizes are good by comparing the sizes to the value close to the actual bandwidth included in the feedback. When the sizes are relatively long or short compared to the value, the process determines that the sizes are not good.

When the process determines (at 1215) that the bandwidth-estimation sequence sizes are good, the process ends because there is no need for a change. Otherwise, the process determines (at 1220) whether a suitably sized bandwidth-estimation sequence has been sent out. The process checks the size of the next bandwidth-estimation sequence and determines whether that size is suitable (e.g., it is not too long or too short) for accurate bandwidth estimation based on the feedback.

When the process determines (at 1220) that a suitably sized bandwidth-estimation sequence has been sent out, the process ends. Otherwise, process 1200 determines (at 1225) whether a timer has been timed out. The timer in some embodiments counts down a period of time (e.g., in tens of milliseconds) allowed for the process to wait for a suitably sized bandwidth-estimation sequence to be sent out before the process makes a change with the sizes of the bandwidth-estimation sequences. By waiting for a suitably sized bandwidth-estimation sequence, the process prevents an unnecessary change with the sizes of the bandwidth-estimation sequences to be sent out.

In some embodiments, the length of the period of time that the timer counts down is adjustable. The process adjusts the length of the period based on the historic sizes of the bandwidth-estimation sequences as well as the received feedback. For example, the longer the suitable size of a bandwidth-estimation sequence is, the longer the length of the period of time the process needs to wait will be. Also, the length of the period would be longer when the long bandwidth-estimation sequences have been sent out.

When the process determines (at 1225) that the timer has not timed out yet, the process loops back to 1220 to check the size of the next bandwidth-estimation sequence to be sent out. Otherwise, process 1200 changes bandwidth-estimation sequences size. When the bandwidth-estimation sequences have been short for the actual bandwidth, the process directs the sender device to process data differently to generate more data. For instance, the process may direct the sender device to increase the quality of the video by adjusting encoding so that more video data for each video frame is generated. The process may also direct the sender device to add filler data to increase the size of the bandwidth-estimation sequences. The process then directs the sender device to enlarge the size of each bandwidth-estimation sequence with the additional data.

When the bandwidth-estimation sequences have been long for the actual bandwidth, the process directs the sender device to reduce the sizes of the bandwidth-estimation sequences to be sent out. For instance, when a sequence of packets is combined with a reference packet to form a bandwidth-estimation packet, the process may label only the first several packets that follow a reference packet as the non-reference packets of the bandwidth-estimation sequence.

One of ordinary skill in the art will recognize that process 1000 is a conceptual representation of the operations used to generate bandwidth-estimation sequences. The specific operations of process 1000 may not be performed in the exact order shown and described. The specific operations may not be performed in one continuous series of operations, and different specific operations may be performed in different embodiments. Furthermore, the process could be implemented using several sub-processes, or as part of a larger macro process.

For instance, instead of determining (at 1220) whether a suitably sized bandwidth-estimation sequence has been sent out, the process determines whether a piece of data that will be packetized into the next bandwidth-estimation sequence is suitably sized. As described above, a bandwidth-estimation sequence is generated by associating a set of packets from one stream and a packet from another stream in some embodiments. When the set of packets is packetized from data for a video frame, the process can determine the size of the next bandwidth-estimation by examining the size of data for a video frame that will be packetized into the next bandwidth-estimation sequence.

B. Different Ways to Lengthen Bandwidth-Estimation Sequences

As described above, the method of some embodiments adjust the bandwidth-estimation sequences by putting more data in each bandwidth-estimation sequence. The additional data that the method generates are different in different embodiments. In some embodiments, the method generates the additional data by changing quality of data (e.g., by increasing video quality). In other embodiments, the method may also generate filler data (e.g., some random data) to put into the sequences. FIGS. 13-16 below illustrate several different combinations of using the additional data in order to lengthen a bandwidth-estimation sequence.

Figure 13:
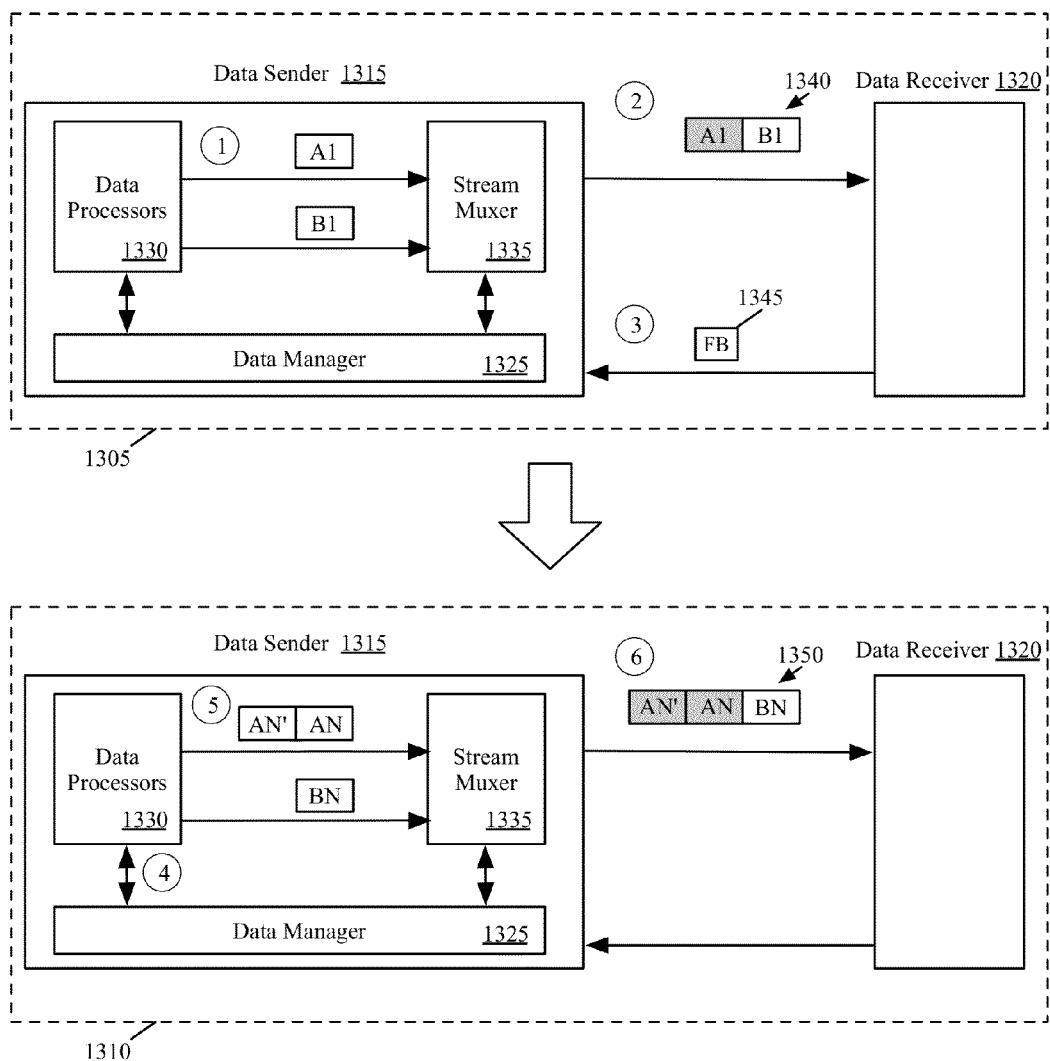
FIG. 13 conceptually illustrates increasing the size of a bandwidth-estimation sequence by putting more packets into the sequence.

FIG. 13 conceptually illustrates increasing the size of a bandwidth-estimation sequence by putting more packets into the sequence. Specifically, this figure illustrates in two stages 1305 and 1310 that a data sender 1315 generates more data to put more number of data packets in a bandwidth-estimation sequence to increase the size of the bandwidth-estimation sequence. This figure also illustrates that the data sender 1315 keeps the sizes of the packets at a uniform size. As shown, the data sender 1315 includes a data manager 1325, data processors 1330, and a stream muxer 1335. This figure also illustrates a data receiver 1320.

The data receiver 1320 is a device similar to the data receiver 210 described above by reference to FIG. 2. The modules that the data receiver 1320 includes, which are not depicted in this figure for simplicity, are similar to the corresponding modules 230, 235, and 240 of the data receiver 210. The data sender 1315 is a device similar to the data sender 205 described above by reference to FIG. 2. The data manger 1325, the data processors 1330, and the stream muxer 1335 are also similar to the corresponding modules 245, 250, and 255 described above by reference to FIG. 2. Within stage 1305, there are sub-stages 1, 2, and 3, which are denoted in this figure with encircled numbers. The stage 1310 includes sub-stages 4, 5, and 6.

At stage 1305, the data sender 1315 and the data receiver 1320 establishes a connection between them and start a communication session by exchanging data. At sub-stage 1, the data processors 1330 generate two different streams of different data types and send them to the stream muxer 1335. One stream includes packet A1, which is packet of a data type (e.g., a video packet). The other stream includes packet B1, which is a packet of another data type (e.g., an audio packet). The stream muxer 1335 combines the streams into a single combined stream. As the stream muxer 1335 combines the streams from the data processors 1330, the stream muxer 1335 selects packet A1 to associate with a packet from the other stream. The stream muxer 1335 receives packets A1 and B1 around the same time. The stream muxer 1335 associates packets A1 with B1 to form a bandwidth-estimation sequence 1340.

At sub-stage 2, the data sender 1335 sends the combined stream that includes the bandwidth-estimation sequence 1340. The data receiver 1320 receives the bandwidth-estimation sequence 1340 and computes the bandwidth estimation based on the received sequence. The data receiver 1320 finds a value closer to the actual available bandwidth using historic bandwidth estimations, the currently computed bandwidth estimation, and other networking data. Then the bandwidth estimator includes the computed bandwidth estimation and the number close to the actual bandwidth in feedback 1345. At sub-stage 3, the data receiver 1320 sends the feedback 1345 to the data sender 1315. When the feedback reaches the data sender 1315, the data manager 1325 receives the feedback.

At stage 1310, the data manager 1325 analyzes the feedback. The data manager 1325 determines whether the sizes of the bandwidth-estimation sequences that it has been monitoring have been suitable compared to the value close to the actual bandwidth for accurate estimation of the bandwidth. The data manger 1325 determines that the sequences that have been sent out are not long enough for accurately estimating the bandwidth. Based on the feedback and the historical sizes of the sequences that have been sent out, the data manager 1325 determines the length of a time period to wait for a sequence with an appropriate size to be sent out. Such a sequence is not sent out within the time period. At the sub-stage 4, the data manager 1325 directs the data processors 1330 to process data differently so as to generate additional data. The data manager 1325 also decides the amount of data by which to increase the bandwidth-estimation sequence based on the feedback.

The processors 1330 generate more data. For example, a video processor of the data processors 1330 changes encoding (e.g., use smaller quantization parameters) so that more data are generated for a video frame. An audio processor of the data processors 1330 does not make any change with its processing of the audio data. The video processor then packetizes the processed video data. The video processor keeps the sizes of the video packets it generates at a uniform size. With more data, the video processor generates two video packets AN and AN' for a video frame instead of one video packet that it would have generated, had encoding been not changed. The audio processor generates an audio packet BN.

At sub-stage 5, the processors 1330 send the packets to the stream muxer 1335. As the stream muxer 1335 combines the streams received from the data processors 1330, the stream muxer 1335 selects the back-to-back packets AN and AN' to associate with a packet from the other stream. The stream muxer 1335 receives packets AN and BN around the same time. The stream muxer 1335 associates packets AN and AN' with BN to form a bandwidth-estimation sequence 1350. Because the bandwidth-estimation sequence has two non-reference packets rather than one, the bandwidth-estimation sequence 1350 is larger than what it would have been. At sub-stage 6, the stream muxer 1335 sends the bandwidth-estimation sequence 1350 to the data receiver 1320.

Figure 14:
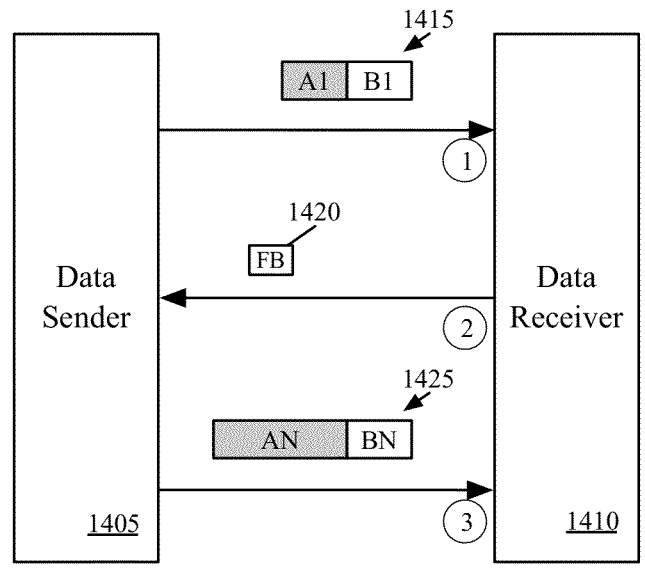
FIG. 14 conceptually illustrates increasing the size of a bandwidth-estimation sequence by putting more data into packets of the sequence.

FIG. 14 conceptually illustrates increasing the size of a bandwidth-estimation sequence by putting more data into packets of the sequence. Specifically, this figure illustrates in three stages 1-3 that a data sender 1405 generates more data to generate bigger data packets to include in a bandwidth-estimation sequence. The encircled numbers illustrated in this figure denote the three stages.

The data sender 1405 is a device similar to the data sender 1315 described above by reference to FIG. 13. The data receiver 1410 is a device similar to the data receiver 210 described above by reference to FIG. 2. The modules that are included in the data sender 1405 and the data receiver 1410 are similar to the corresponding modules 1325, J30, 1335, 2430, 235, and 240. These modules of the devices 1405 and 1410 are not depicted in FIG. 14 for simplicity of the description.

The data sender 1405 generates a bandwidth-estimation sequence 1415 when it combines two streams into one stream. The bandwidth-estimation sequence 1415 includes packets B1 and A1. Packet B1 is the reference packet and packet A1 is the non-reference packet of the sequence 1415. At stage 1, the data sender 1405 sends the combined stream that includes the bandwidth-estimation sequence 1415 to the data receiver 1410. Upon receiving the bandwidth-estimation sequence 1415, the data receiver 1410 generates a feedback 1420 based on the received sequence 1415. At stage 2, the data receiver sends the feedback 1420 to the data sender 1405.

The data sender 1405 receives and analyzes the feedback 1420. Based on the feedback, the data sender 1405 determines that the sequences that have been sent out are not long enough for accurately estimating the bandwidth. The data sender 1405 decides to increase the size of the bandwidth-estimation sequence to be sent out. The data sender 1405 also decides the amount of data by which to increase the bandwidth-estimation sequence based on the feedback. The data sender 1405 generates more data for one type of data. For example, the data sender 1405 changes encoding so that it generates more data for a video frame. That is, the data sender 1405 adjusts encoding so that the amount of data that it generates for a frame after adjusting encoding is larger than the amount of data that it would have generated without adjusting the encoding.

The data sender then packetizes the processed video data. The data sender 1405 in some embodiments does not keep the sizes of the video packets it generates at a uniform size. With the additional data it generated, the data sender 1405 generates one video packet AN. The size of this packet is larger than the size that this packet would have had without the change with the encoding. Without the change, the size of packet AN would have been about the size of packet A1. The data sender also generates packet BN for a different data type (e.g., audio data). The data sender associates packet AN with BN to form a bandwidth-estimation sequence 1425. Because packet AN is larger than what it would have been, the bandwidth-estimation sequence 1425 is also larger than what it would have been. At stage 3, the data sender 1405 sends the bandwidth-estimation sequence 1425 to the data receiver 1410.

Figure 15:
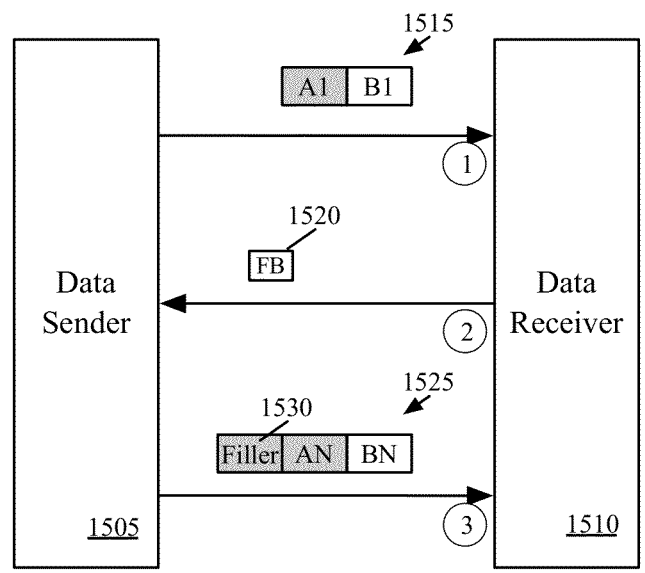
FIG. 15 conceptually illustrates increasing the size of a bandwidth-estimation sequence by putting more packets into the sequence.

FIG. 15 conceptually illustrates increasing the size of a bandwidth-estimation sequence by putting more packets into the sequence. Specifically, this figure illustrates in three stages 1-3 that a data sender 1505 generates filler data to put more number of data packets in a bandwidth-estimation sequence to increase the size of the bandwidth-estimation sequence. The encircled numbers illustrated in this figure denote the three stages.

The data sender 1505 is a device similar to the data sender 1315 described above by reference to FIG. 13. The data receiver 1510 is a device similar to the data receiver 210 described above by reference to FIG. 2. The modules that are included in the data sender 1505 and the data receiver 1510 are similar to the corresponding modules 1325, J30, 1335, 2430, 235, and 240. These modules of the devices 1505 and 1510 are not depicted in FIG. 15 for simplicity of the description.

The data sender 1505 generates a bandwidth-estimation sequence 1515 when it combines two streams into one stream. The bandwidth-estimation sequence 1515 includes packets B1 and A1. Packet B1 is the reference packet and packet A1 is the non-reference packet of the sequence 1515. At stage 1, the data sender 1505 sends the combined stream that includes the bandwidth-estimation sequence 1515 to the data receiver 1510. Upon receiving the bandwidth-estimation sequence 1515, the data receiver 1510 generates a feedback 1520 based on the received sequence 1515. At stage 2, the data receiver sends the feedback 1520 to the data sender 1505.

The data sender 1505 receives and analyzes the feedback 1520. Based on the feedback, the data sender 1505 determines that the sequences that have been sent out are not long enough for accurately estimating the bandwidth. The data sender 1505 decides to increase the size of the bandwidth-estimation sequence to be sent out. The data sender 1505 also decides the amount of data by which to increase the bandwidth-estimation sequence based on the feedback. The data sender 1505 generates filler data. The data sender 1505 also processes data that carries the content (e.g., video, audio, etc.) that the sender intends to convey to the data receiver 1510. The data sender then packetizes the processed content data and filler data to generate packet BN, AN, and a filler data packet 1530. The data sender 1505 in some embodiments keeps the sizes of the data packets it generates at a uniform size.

With the filler data packet 1530 it additionally generated, the data sender 1505 generates a bandwidth-estimation sequence 1525 by associating packet AN and the filler data packet 1530 with packet BN. As a result, the bandwidth-estimation sequence 1525 is larger than what it would have been without the filler data packet 1530. At stage 3, the data sender 1505 sends the bandwidth-estimation sequence 1525 to the data receiver 1510.

Figure 16:
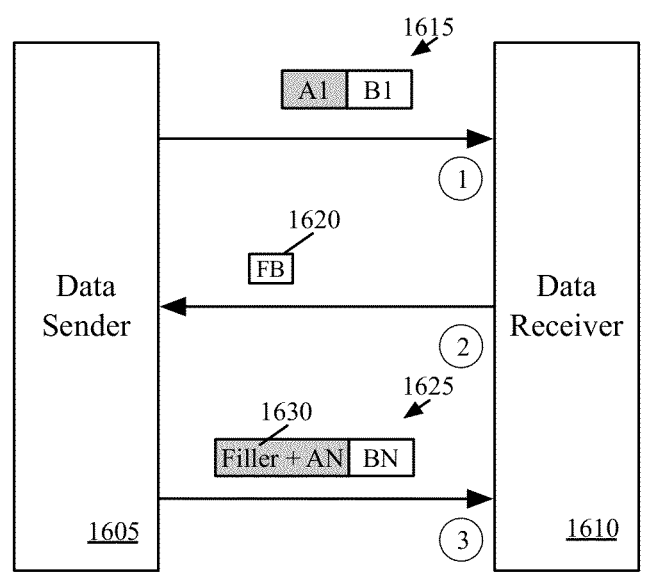
FIG. 16 conceptually illustrates increasing the size of a bandwidth-estimation sequence by putting more data into packets of the sequence.

FIG. 16 conceptually illustrates increasing the size of a bandwidth-estimation sequence by putting more data into packets of the sequence. Specifically, this figure illustrates in three stages 1-3 that a data sender 1605 generates filler data to generate bigger data packets to include in a bandwidth-estimation sequence. The encircled numbers illustrated in this figure denote the three stages.

The data sender 1605 is a device similar to the data sender 1315 described above by reference to FIG. 13. The data receiver 1610 is a device similar to the data receiver 210 described above by reference to FIG. 2. The modules that are included in the data sender 1605 and the data receiver 1610 are similar to the corresponding modules 1325, J30, 1335, 2430, 235, and 240. These modules of the devices 1605 and 1610 are not depicted in FIG. 16 for simplicity of the description.

The data sender 1605 generates a bandwidth-estimation sequence 1615 when it combines two streams into one stream. The bandwidth-estimation sequence 1615 includes packets B1 and A1. Packet B1 is the reference packet and packet A1 is the non-reference packet of the sequence 1615. At stage 1, the data sender 1605 sends the combined stream that includes the bandwidth-estimation sequence 1615 to the data receiver 1610. Upon receiving the bandwidth-estimation sequence 1615, the data receiver 1610 generates a feedback 1620 based on the received sequence 1615. At stage 2, the data receiver sends the feedback 1620 to the data sender 1605.

The data sender 1605 receives and analyzes the feedback 1620. Based on the feedback, the data sender 1605 determines that the sequences that have been sent out are not long enough for accurately estimating the bandwidth. The data sender 1605 decides to increase the size of the bandwidth-estimation sequence to be sent out. The data sender 1605 also decides the amount of data by which to increase the bandwidth-estimation sequence based on the feedback. The data sender 1605 generates filler data. The data sender 1605 also processes data that carries the content (e.g., video, audio, etc.) that the sender intends to convey to the data receiver 1610.

The data sender then packetizes the processed content data and filler data. The data sender 1605 in some embodiments does not keep the sizes of the data packets it generates at a uniform size. Instead of generating a filler data packet and a content data packet AN, the data sender 1605 inserts the additional filler data and the content data that would have gone into a separate packet into one data packet 1630. The size of this packet is larger than the size that this packet would have had without the filler data. Without the filler data, the packet would have been about the size of packet A1. The data sender also generates packet BN. The data sender associates packet 1630 with BN to form a bandwidth-estimation sequence 1625. Because packet 1630 is larger than what it would have been without the additional filler data, the bandwidth-estimation sequence 1625 is also larger than what it would have been. At stage 3, the data sender 1605 sends the bandwidth-estimation sequence 1625 to the data receiver 1610.

IV. Software Architecture

A. Architecture for Data Sender Module

Figure 17:
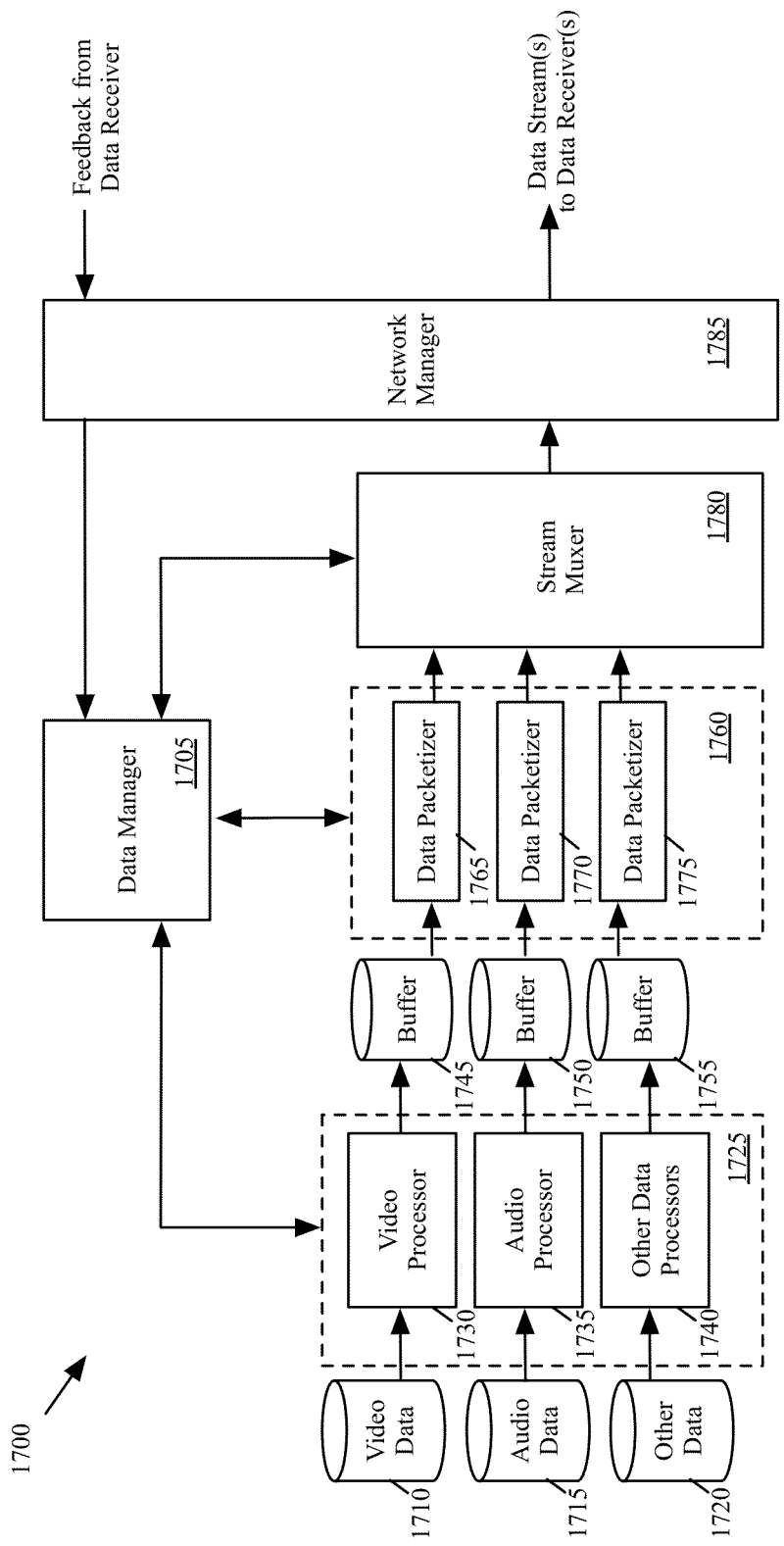
FIG. 17 conceptually illustrates architecture of a data sender module of a data sender device in some embodiments.

FIG. 17 conceptually illustrates an architecture of a data sender module 1700 of a data sender device of some embodiments. The data sender module 1700 generates several streams of different data types. The data sender module 1700 combines these streams into a single combined stream in some embodiments to send it to a data receiver module of a data receiver device. When combining the streams into a combined stream, the data sender module 1700 generates bandwidth-estimation sequences for the data receiver module to use in computing bandwidth estimation. The data sender module 1700 receives feedbacks from the data receiver module. Based on the received feedbacks, the data sender module 1700 adjusts its data processing in order to adapt to the current network conditions provided in the feedbacks and to adjust the lengths of the bandwidth-estimation sequences to send out.

As shown, the data sender module 1700 includes a data manager 1705, data storages 1710-1720, data processors 1725, buffers 1745-1755, data packetizers 1760, a stream muxer 1780, and a network manager 1785.

The data manager 1705 in some embodiments oversees the operation of the data sender module 1700 by directing other modules of the data sender module 1700. The data manager 1705 directs the data processors 1725 to process data to eventually transmit to the data receiver module. For instance, the data manager 1705 controls video processing by providing video processing parameters to the video processor 1730. Examples of the video processing parameters include the parameters that identify frame rate, video resolution, encoders, quantization stepsize, etc. The data manager 1705 may also control audio processing by providing audio processing parameters to the audio processor 1735. Examples of the audio processing parameters include the parameters that identify sampling rate, encoders, audio data format, etc. Similarly, the data manager 1705 controls processing of other data types. For instance, when the data sender device and the data receiver device are in an audio/video conference, the other data types may include the data that relate to the conference settings such as user identification and authentication information, etc.

The data manager 1705 directs the data packetizers 1760 to control packetizing operations. For instance, the data manager 1705 may provide kinds of information to include in the packets to generate. The data manager directs the packetizers the types of data to include in the payload. The data manager 1705 may also set the sizes of the packets to generate and determine whether to keep all packets at a uniform size.

The data manager 1705 directs the stream muxer 1780 to control stream combining operations. For example, the data manager 1705 provides the number and identifications of the packetizers from which the stream muxer 1780 is to receive the data streams. The data manager 1705 may also provide a set of rules that the stream muxer 1780 should follow when combining the streams. An example rule mandates the stream muxer 1780 to place the packets from the streams in the combined stream in the order that the stream muxer 1780 receives the packets.

The data manager 1705 also directs the stream muxer 1780 in generating bandwidth-estimation sequences. For example, the data manager 1705 provides the identifications of the packetizers from which the stream muxer 1780 should get reference and non-reference packets at any given moment. The data manager 1705 may also dictate the length of the bandwidth-estimation sequences that should be generated. The data manager 1705 sets the intervals of time that the stream muxer 1780 should generate bandwidth-estimation sequences. In some embodiments, the data manager 1705 may have the stream muxer 1780 insert duplicate non-reference packets in a bandwidth-estimation sequence so as to increase the lengths of the bandwidth-estimation sequences. Such duplicate packets may be used for error correction purposes by the data receiver module.

The data manager 1705 directs the network manager to control networking and data transmitting operations. For example, the data manager 1705 provides the identification(s) of the device(s) to which the data manager 1705 should send the data stream(s). Also, the data manager dictates the protocols (e.g., UDP, TCP, etc.) for the network manager to use to transmit the packet streams. The data manager 1705 receives from the network manager 1785 feedbacks and other networking data (e.g., packet loss, one-way latency, and roundtrip delay time, etc.). The data manager 1705 directs other modules of the data sender module 1700 to adapt to the current network conditions and the feedbacks and to adjusts the lengths of the bandwidth-estimation sequences to send out.

The data storages 1710-1720 in some embodiments store data before they are processed by the data processors 1725. For instance, the video data storage 1710 may store raw video data before they are processed (e.g., quantized, encoded, formatted, etc.) by the video processor 1730.

The audio data storage 1715 may store raw audio data received from an audio source (e.g., a microphone) before the data are processed (e.g., sampled, encoded, formatted, etc.) by the audio processor 1735. Other data storage 1720 stores other types of data before processed by the other data processors 1740. The data processors 1725 process the data that they retrieve from the data storages 1710-1720 as directed by the data manager 1705. The data processors 1725 buffer the processed data using the buffers 1745-1755.

The data packetizers 1760 convert the processed data that are buffered in the buffers 1745-1755 into data packets, as directed by the data manager 1705. Each of the packetizers 1765-1775 sends a stream of the packets that each generated to the stream muxer 1780.

The stream muxer 1780 receives the streams of data packets from the data packetizers 1760 and combines them into one stream, as directed by the data manager 1705. In some cases, the stream muxer 1780 relay some of the streams to the network manager 1785 without combining them when it is directed so by the data manager 1705. The stream muxer 1780 also generates bandwidth-estimation sequences when combining the streams. The stream muxer 1780 generates the bandwidth-estimation sequences and adjusts lengths of them in similar manners that the stream muxers 115, 255, 405, and 1335 described above by reference to FIGS. 1-2, 4-8, and 13 do.

The network manager 1785 receives one or more data streams from the stream muxer 1780 and transmits the packets in the stream to the destination device(s) as directed by the data manager 1705. As the network manager 1785 transmits the packets, the network manager 1785 in some embodiments inserts in the headers of packets timestamps that identify the times at which the packets left the data sender device. The network manager 1785 also receives feedbacks from the data receiver module and relays to the data manager 1705. In addition, the network manager 1785 establishes connections between the data sender device and other devices with which the data sender device is to exchange data.

An example operation of the data sender module 1700 will now be described. The data manager 1705 directs the network manager 1785 to establish a connection with a data receiver device in order to start an audio/video conference. When the connection is established, the data manager directs the data processors 1725, the data packetizers 1760, and the stream muxer 1780 to generate a combined stream of three streams that include bandwidth-estimation sequences. The data processors 1730-1740 retrieve data from the data storages 1710-1720 and process the data. The video processor 1730 processes the raw video data from the video data storage 1710 to generate encoded data for video frames. The audio processor 1735 processes the raw audio data to format it into audio data. The other data processors 1740 compress data representing the conference settings. The processed data get buffered in buffers 1745-1755 before the data packetizers retrieve the data.

The data packetizer 1765 converts the processed video data from buffer 1745 into packets each of which contains a piece of video data. The data packetizer 1770 converts the processed audio data from buffer 1750 into audio packets each of which contains audio samples that represent certain time period worth of audio content. The data packetizer 1775 generates packets out of the compressed data.

The stream muxer 1780 combines the streams of data packets from the packetizers 1765-1775 into a single combined stream by placing the packets in the combined stream in the order the stream muxer 1780 receives the packets. As the stream muxer 1780 combines the streams, the stream muxer 1780 selects a sequence of video packets from the data packetizer 1765 (e.g., at every second) and associates the sequence with an audio packet from the data packetizer 1770. The sequence of video packets and the audio packet forms a bandwidth-estimation sequence within the combined stream.

The data manager 1705 monitors the bandwidth-estimation sequences as they are being generated by the stream muxer 1780. The network manager 1785 receives the combined stream from the stream muxer 1780 and timestamps every packet in the stream before sending them out to the data receiver device.

At a later time, the network manager 1785 receives a feedback from the data receiver and relays the feedback to data manager 1705. The data manager 1705 analyzes the feedback and determines that the sizes of the bandwidth-estimation sequences have been too short for accurate estimation of the bandwidth of the connection. The data manager 1705 determines that the lengths of the bandwidth-estimation sequences need to be increased. The data manager 1705 subsequently increases the lengths of the bandwidth-estimation sequences to send out by directing the modules 1725, 1760, and 1780 accordingly. Based on the estimated bandwidth included in the feedback, the data manager 1705 also increases the quality of the video and audio to more efficiently utilize the available bandwidth and thereby provide better user experience to the participants of the audio/video conference.

B. Architecture for Data Receiver Module

Figure 18:
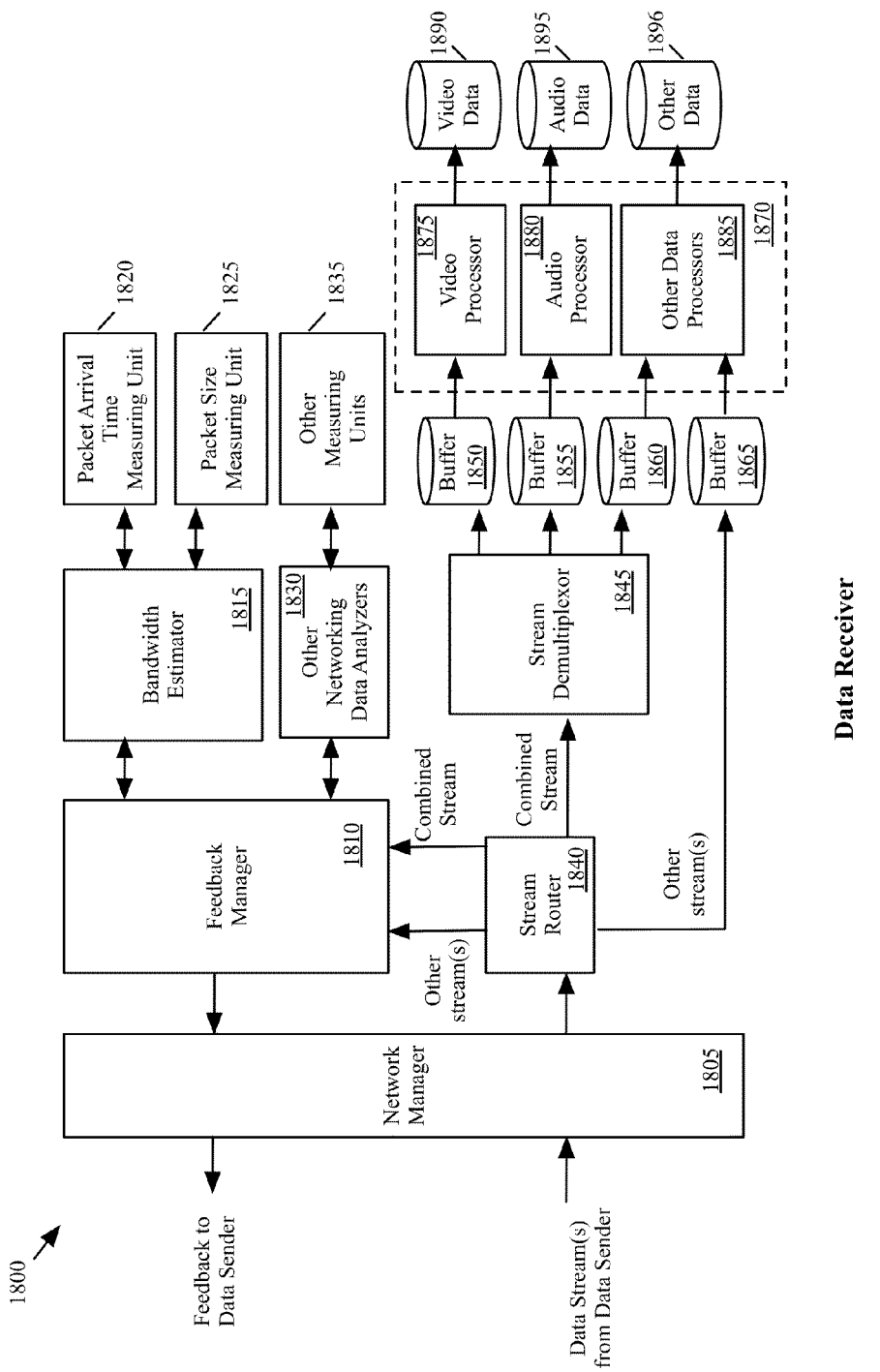
FIG. 18 conceptually illustrates architecture of a data receiver module of a data receiver device of some embodiments.

FIG. 18 conceptually illustrates an architecture of a data receiver module 1800 of a data receiver device of some embodiments. The data receiver module 1800 receives one or more streams of data packets from a data sender module of a data sender device, such as the data sender module 1700 described above by reference to FIG. 17. One of the streams that the data receiver module 1800 receives is a combined stream of different data types generated by the data sender module. The combined stream includes bandwidth-estimation sequences. Based on the bandwidth-estimation sequences, the data receiver module 1800 estimates the bandwidth of a connection between the data sender device and the data receiver device. The data receiver module 1800 also computes other networking data such as packet loss rate, one-way latency, roundtrip delay time, etc. The data receiver module 1800 includes the computed networking data into a feedback and sends the feedback to the data sender device. The data receiver module 1800 also separates (e.g., de-multiplexes) the combined stream into several streams of different data types.

As shown, the data receiver module 1800 includes a networking manager 1805, a feedback manager 1810, a bandwidth estimator 1815, a packet arrival time measuring unit 1820, a packet size measuring unit 1825, other networking data analyzers 1830, other measuring units 1835, a stream router 1840, a stream de-multiplexor 1845, buffers 1850-1865, data processors 1870, and data storages 1890-1896.

The feedback manager 1810 generates feedback based on the streams received from the data sender device. The feedback in some embodiments includes bandwidth estimation, packet loss rate, one-way latency, roundtrip delay time, etc. The feedback manager 1810 receives the stream from the stream router 1840 and uses the bandwidths estimator 1815 and other networking data analyzers 1830 to prepare feedbacks.

The bandwidth estimator 1815 is a module similar to the bandwidth estimator 140, 240, and 1105 described above by reference to FIGS. 1, 2, and 11. It computes the bandwidth estimation using the packet arrival time measuring unit 1820 and the packet size measuring unit 1825 and sends it to the feedback manager to have the estimation included in the feedback. The packet arrival time measuring unit is a module similar to the packet arrival time measuring units 130, 230, and 1110 described above by reference to FIGS. 1, 2, and 11. The packet size measuring unit is a module similar to the packet size measuring units 135, 235, and 1115 described above by reference to FIGS. 1, 2, and 11.

The other networking data analyzers 1830 compute networking data other than bandwidth estimation that are to be included in the feedback, such as packet loss rate, one-way latency, roundtrip delay time, etc. A roundtrip delay time is determined based on packets sent to the data sender and the receipt of acknowledgments from that device. In some cases, the networking data analyzers 1830 have the acknowledgement to the data sender included the feedback so that the data sender device can compute the round delay time from its point of view. The networking data analyzers 1830 compute packet loss rate based on the number of packets lost and the total number of packets that should have arrived at the data receiver device. The networking data analyzers 1830 compute one-way latency based on the arrival times of the packets and the timestamps of the packets. Specifically, in some embodiments, each audio packet is time stamped. In the absence of packet delay, the remote devices should receive the audio packets at set intervals that are equal to the difference in the time stamps. However, when there is one-way latency delay, the remote device receives the audio packets at intervals greater than the difference in the time stamps.

The networking data analyzers 1830 compute the data based on the streams of data packets received from the data sender device. The networking data analyzers 1830 use other measuring units 1835. The other measuring units 1835 in some embodiments include a unit that measures the difference in the time stamps of the received packets. In some embodiments, the networking data analyzers 1830 also use packet arrival time measuring unit 1820.

The network manager 1805 receives one or more data streams from the data sender device and sends them to the stream router 1840. In some embodiments, the stream router 1840 inserts in the headers of the packets the times that the data receiver device (i.e., the network manager 1805) receives the packets. The stream router 1840 routes the streams to other modules of the data receiver module 1800. The network manager 1805 also receives feedbacks from the feedback manager 1810 and relays to the data sender device. In addition, the network manager 1805 establishes connections between the data receiver device and the data sender device.

The stream router 1840 routes the streams received through the network manager 1805 to other modules of the data receiver module 1800 including the feedback manager 1810 and the stream multiplexor 1845. The received streams include a combined stream that the data sender device generated from several streams. The received streams may also include streams of data packets of single data types if there are any sent by the data sender device. Theses non-combined streams are buffered in the buffer 1865 before the data processors 1870 process them.

The stream demultiplexor 1845 receives a combined stream generated by the data sender device and separates (e.g., demultiplexes) the stream into several streams. The stream demultiplexor 1845 uses the information included in the packets (e.g., in the headers of the packets) to find out the streams the packets should be in, after the combined stream is separated out. The separated streams are buffered in the buffers 1850-1860 before the data processors 1870 process them.

The data processors 1870 retrieve the streams from the buffers 1850-1865 and process them. The data processors 250 extract the data in the packets and restore them back to the form before the data were packetized. The data processors 1870 then store the depacketized data in the data storages 1890-1896.

An example operation of the data receiver module 1800 will now be described. The network manager 1805 establishes a connection with a data sender device over which to exchange data. The network manager 1805 receives a combined stream of video and audio packets from the data sender device. The stream router 1840 then routes the combined stream to the feedback manager 1810 and the stream demultiplexor 1845.

The feedback manager 1810 receives the combined stream from the stream router 1840 and starts preparing feedback to send back to the data sender device. The feedback manager computes bandwidth estimation using the bandwidth estimator 1815. The bandwidth estimator 1815 estimates the bandwidth of the connection between the data sender device and the data receiver device. Based on the combined stream and the bandwidth-sequences included in the stream, the bandwidth estimator 1815 estimates the bandwidth using the packet arrival time measuring unit 1820 and the packet size measuring unit 1825.

The feedback manager 1810 also computes one-way latency using one of the networking data analyzers 1830. The networking data analyzer measures intervals between arrival times of the packets in the stream using the packet arrival time measuring unit 1820. The networking data analyzer also measures the intervals between the times when the packets left the data sender device using one of the other measuring unites 1835. Based on these two types of intervals, the network data analyzer computes one-way latency and sends it to the feedback manager 1810.

The feedback manager 1810 includes the computed bandwidth estimation and one-way latency into feedback and sends it to the network manager 1805. The network manager 1805 transmits the feedback data to the data sender device.

The stream demultiplexor 1845 separates the combined stream into one stream of video data packets and one stream of audio data packets. The video processor 1875 retrieves the video stream from the buffer 1850 and de-packetizes the data in the stream. The video processor 1875 performs other operations as well (e.g., decoding) and stores the processed video data in the video data storage 1890. The audio processor 1880 retrieves the audio stream from the buffer 1855 and de-packetizes the data in the stream. The audio processor 1880 performs other operations as well (e.g., decoding) and stores the processed audio data in the audio data storage 1895.

V. Packet Structure

Figure 19:
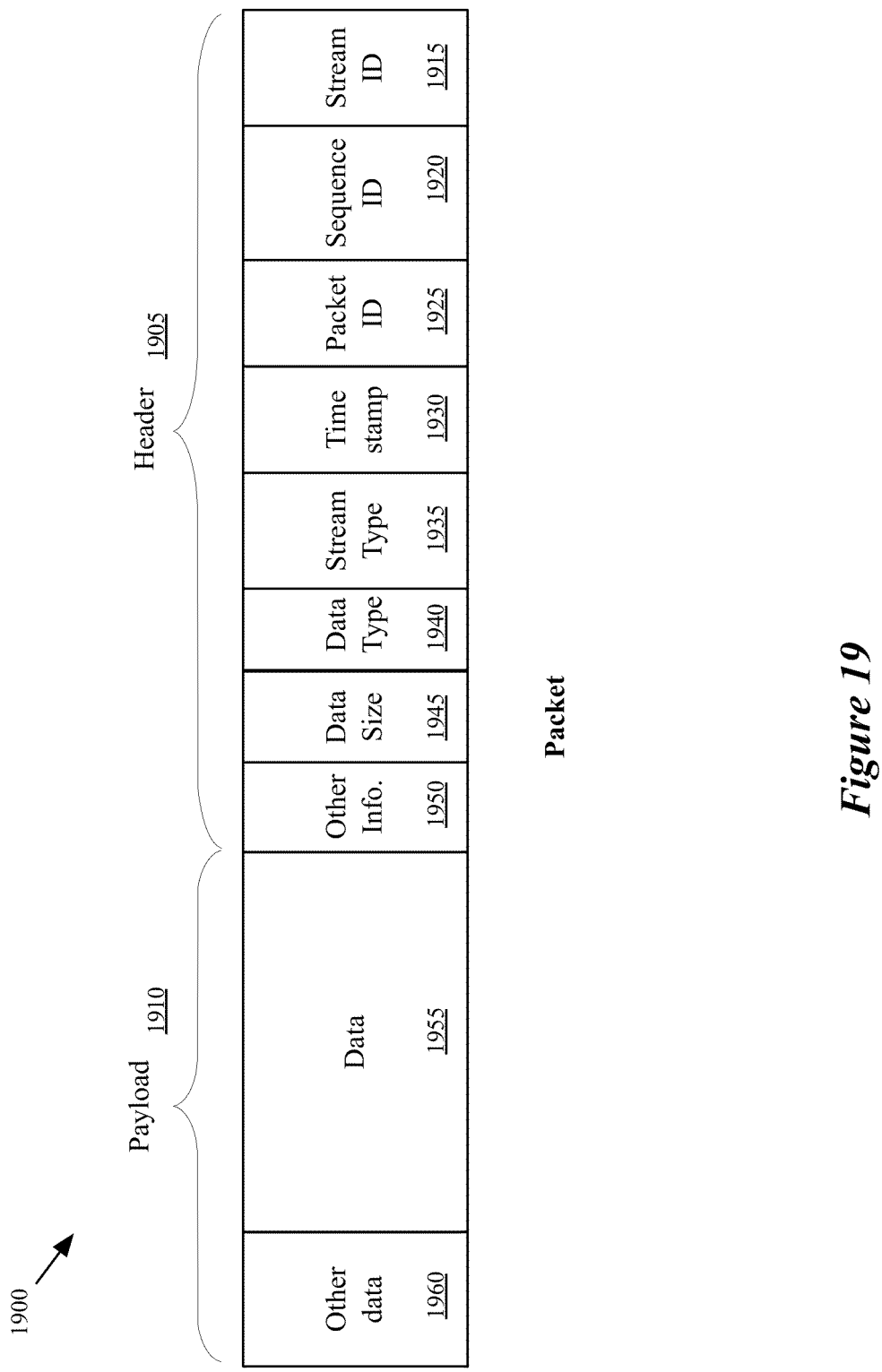
FIG. 19 conceptually illustrates a data packet that some embodiments use.

FIG. 19 conceptually illustrates a data packet 1900 that some embodiments use to send data from a data sender device to a data receiver device over a packetized network. In some embodiments, the packet 1900 is an RTP (Real-time Transport Protocol) packet that includes RTP header 1910 and payload 1915. One of ordinary skill in the art will recognize that packets implemented for any other protocol can be utilized in some embodiments of the invention.

As shown, the header 1910 includes a stream ID 1915, a sequence ID 1920, a packet ID 1925, a time stamp 1930, a stream type 1935, a data type 1940, a data size 1945, other information 1950, data 1955, and other data 1960.

The stream ID includes identification of a data stream that packet 1900 is part of. The stream ID in some embodiments can be changed during the life of the packet. For instance, when the stream that the packet was initially part of is combined with other streams into a new combined stream, the stream ID will have the identification of the new combined stream. Some embodiments may retain old identification for demultiplexing the new combined stream to the original streams.

The sequence ID includes identification of a sequence to which packet 1900 belongs. As described above, a sequence of packets in some embodiments is a set of concatenated packets. When a sequence of packets is a bandwidth-estimation sequence, a data receiver device of some embodiments uses the sequence ID to identify the packets in the bandwidth-estimation sequence. The packet ID 1905 includes identification of packet 1900. The packet ID 1905 in some embodiments serves as an index that identifies the location within a data stream.

The time stamp 1930 indicates the time that a packet leaves a device. The data receiver device of some embodiments uses the time stamps of packets to compute various networking data such as one-way latency, etc. In some embodiments, packet 1900 includes another time stamp that indicates the time that a packet is received by a device. The data type 1940 identifies the type of data (e.g., audio, video, etc.) that payload 1910 includes. The data size 1945 quantifies the amount of data (e.g., in bytes) that payload 1910 includes.

Other information 1950 includes other information that header 1905 includes. For instance, the other information 1950 may indicate that packet 1910 is a non-reference packet that is associated with a reference packet that precedes packet 1910 in a bandwidth-estimation sequence. The other information 1950 may also include size and type of the other data 1760 in the payload 1910.

The data 1755 includes the data that packet 1905 purports to carry. For example, when a piece of video data is packetized into several packets, the packets will carry the video data in the data 1755. The other data 1960 includes data other than the data that the packet purports to carry. For example, the other data 1960 may include filler data that some embodiments insert into the packet.

One of ordinary skill in the art will recognize that packet 1900 is a conceptual representation of a data packet used by some embodiments of the invention. The specific components of packet 1900 may not be included in the exact order shown and described. Also, packet 1900 in some embodiments is functional without some of the components shown or may include other components not shown in this figure.

VI. Application

As described above, a first device of some embodiments generates bandwidth-estimation sequences as it combines several streams into one stream. The device sends the combined stream to a second device of some embodiments a connection established between the first and second device. The second device generates feedbacks based on the bandwidth-estimation sequences included in the combined stream. The second device sends the feedbacks back to the first device so that the first device can adjust its processing of data based on the feedbacks.

In the scenario described in the previous paragraph, the first device is a data sender device of some embodiments and the second device is a data receiver device of some embodiment. That is, the first device sends the combined stream to the second device, and the second device sends the feedbacks to the first device. However, this exchange of combined stream and feedback between the first and the second devices can be done in both directions of the connection at the same time in some embodiments. The second device can also send a combined stream that includes bandwidth-estimation sequences to the first device. The first device can also generate feedbacks and send them back to the second device.

Figure 20:
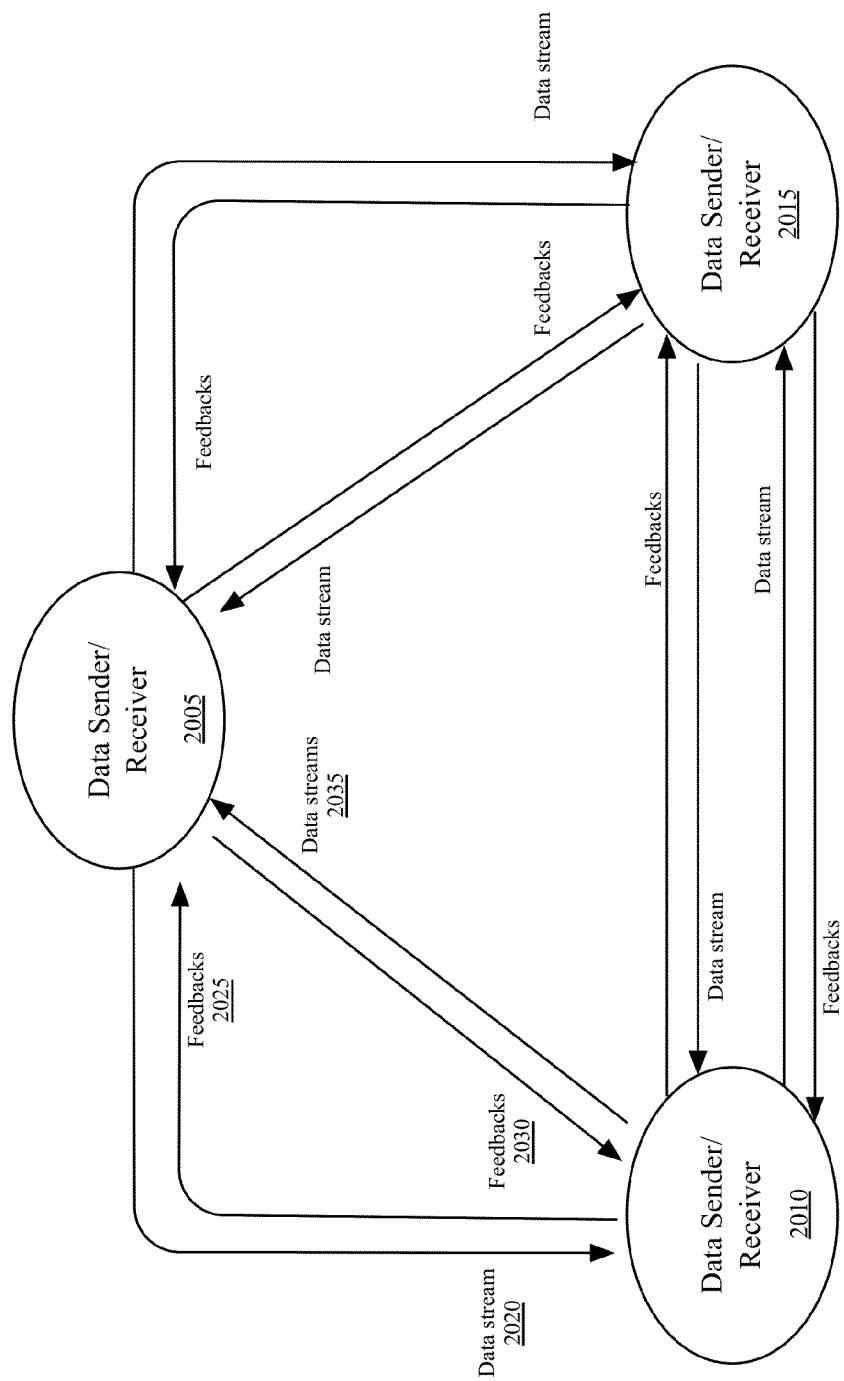
FIG. 20 conceptually illustrates a multi-party communication session.

This bidirectional exchange of combined streams and feedbacks can be applied in a multi-party communication session where more than two devices participate. FIG. 20 conceptually illustrates such a multi-party communication session. Specifically, this figure illustrates that three devices 2005, 2010, and 2015 exchange data streams and feedbacks with each other.

Device 2005 generates several streams, combined them into a combined stream 2020, and sends the combined stream to device 2010. Device 2005 also includes bandwidth-estimation sequences in the combined stream. Device 2010 receives the combined stream 2020 and generates feedbacks 2005 based on the combined stream. Device 2010 sends feedbacks 2005 to device 2025 so that device 2025 can adjust its data processing based on the feedbacks 2005. The feedbacks 2025 contain data regarding the connection between the two devices 2005 and 2010 in one direction which is from device 2005 to device 2010. For the connection in the opposite direction, device 2010 generates a combined stream 2035 that includes bandwidth-estimation sequences, and device 2005 generates and sends feedbacks 2030 to device 2010. In this manner, the two devices 2005 and 2010 adapts to the networking conditions of the connection between them in both directions.

Similarly, devices 2005 and 2015 exchange combined streams and feedbacks in both directions of the connection between the two devices. Devices 2010 and 2015 make such exchange of the data, too.

VII. Computer System

Many of the above-described features and applications are implemented as software processes that are specified as a set of instructions recorded on a non-transitory computer readable storage medium (also referred to as computer readable medium). When these instructions are executed by one or more computational element(s) (such as processors or other computational elements like Application-Specific ICs ("ASIC") and Field Programmable Gate Arrays ("FPGA"), they cause the computational element(s) to perform the actions indicated in the instructions. Computer is meant in its broadest sense, and can include any electronic device with a processor. Examples of computer readable media include, but are not limited to, CD-ROMs, flash drives, Random Access Memory ("RAM") chips, hard drives, Erasable Programmable Read-Only Memories ("EPROM"), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs when installed to operate on one or more computer systems define one or more specific machine implementations that execute and perform the operations of the software programs.

Figure 21:
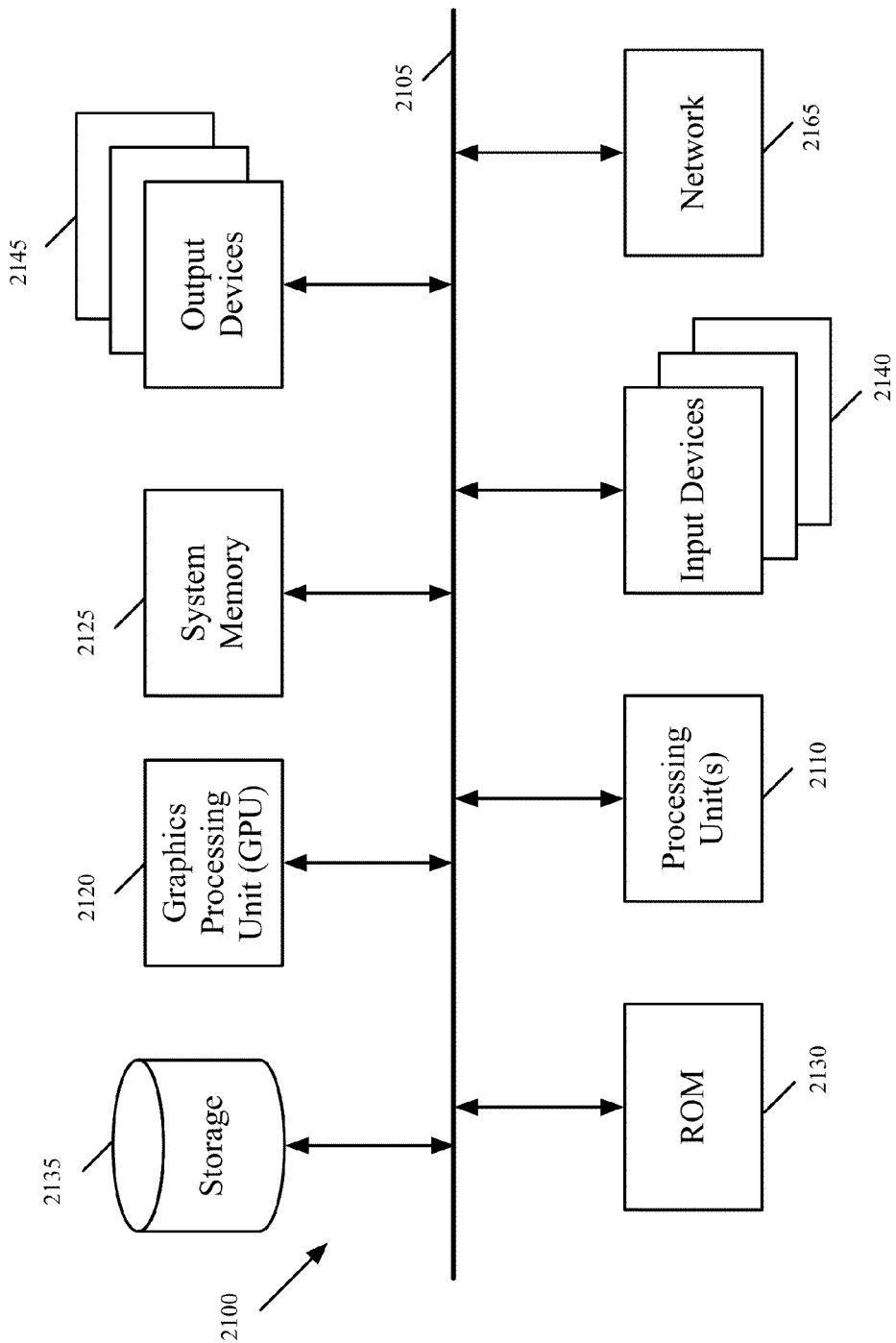
FIG. 21 illustrates a computer system with which some embodiments of the invention are implemented.

FIG. 21 conceptually illustrates a computer system with which some embodiments of the invention are implemented. Such a computer system includes various types of computer readable media and interfaces for various other types of computer readable media. One of ordinary skill in the art will also note that the digital video camera of some embodiments also includes various types of computer readable media. Computer system 2100 includes a bus 2105, processing unit(s) 2110, a graphics processing unit (GPU) 2120, a system memory 2125, a read-only memory 2130, a permanent storage device 2135, input devices 2140, and output devices 2145.

The bus 2105 collectively represents all system, peripheral, and chipset buses that communicatively connect the numerous internal devices of the computer system 2100. For instance, the bus 2105 communicatively connects the processing unit(s) 2110 with the read-only memory 2130, the GPU 2120, the system memory 2125, and the permanent storage device 2135.

From these various memory units, the processing unit(s) 2110 retrieve instructions to execute and data to process in order to execute the processes of the invention. The processing unit(s) may be a single processor or a multi-core processor in different embodiments. While the discussion in this section primarily refers to software executed by a microprocessor or multi-core processor, in some embodiments the processing unit(s) include a Field Programmable Gate Array (FPGA), an ASIC, or various other electronic components for executing instructions that are stored on the processor.

Some instructions are passed to and executed by the GPU 2120. The GPU 2120 can offload various computations or complement the image processing provided by the processing unit(s) 2110. In some embodiments, such functionality can be provided using CoreImage's kernel shading language.

The read-only-memory (ROM) 2130 stores static data and instructions that are needed by the processing unit(s) 2110 and other modules of the computer system. The permanent storage device 2135, on the other hand, is a read-and-write memory device. This device is a non-volatile memory unit that stores instructions and data even when the computer system 2100 is off. Some embodiments of the invention use a mass-storage device (such as a magnetic or optical disk and its corresponding disk drive) as the permanent storage device 2135.

Other embodiments use a removable storage device (such as a floppy disk, flash drive, or ZIP® disk, and its corresponding disk drive) as the permanent storage device. Like the permanent storage device 2135, the system memory 2125 is a read-and-write memory device. However, unlike storage device 2135, the system memory is a volatile read-and-write memory, such as a random access memory. The system memory stores some of the instructions and data that the processor needs at runtime. In some embodiments, the invention's processes are stored in the system memory 2125, the permanent storage device 2135, and/or the read-only memory 2130. For example, the various memory units include instructions for processing multimedia items in accordance with some embodiments. From these various memory units, the processing unit(s) 2110 retrieve instructions to execute and data to process in order to execute the processes of some embodiments.

The bus 2105 also connects to the input and output devices 2140 and 2145. The input devices enable the user to communicate information and select commands to the computer system. The input devices 2140 include alphanumeric keyboards and pointing devices (also called "cursor control devices"). The output devices 2145 display frames generated by the computer system. The output devices include printers and display devices, such as cathode ray tubes (CRT) or liquid crystal displays (LCD).

Finally, as shown in FIG. 21, bus 2105 also couples computer 2100 to a network 2165 through a network adapter (not shown). In this manner, the computer can be a part of a network of computers (such as a local area network ("LAN"), a wide area network ("WAN"), or an Intranet, or a network of networks, such as the Internet. Any or all components of computer system 2100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processor and includes sets of instructions for performing various operations. Examples of hardware devices configured to store and execute sets of instructions include, but are not limited to application specific integrated circuits (ASICs), field programmable gate arrays (FPGA), programmable logic devices (PLDs), ROM, and RAM devices. Examples of computer programs or computer code include machine code, such as is produced by a compiler, and files including higher-level code that are executed by a computer, an electronic component, or a microprocessor using an interpreter.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 9, 10, and 12) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

The invention claimed is:

1. A method of combining a plurality of streams of data packets into a single combined stream of data packets and transmitting the combined stream from a first device, the method comprising:

identifying a first set of packets from a first set of streams;

identifying a second set of packets from a different second set of streams;

associating the first set of packets with the second set of packets in the combined stream such that the associated packets have a combined size that is at least a threshold size, wherein the threshold size is at least a size needed for a second device receiving the combined stream to use the associated packets to estimate the bandwidth between the first and the second devices, wherein the associating comprises inserting into a packet in the second set of packets information that identifies at least one packet of the first set of packets;

transmitting the combined stream to the second device via a network connection between the first device and the second device;

receiving from the second device feedback comprising an estimation of bandwidth of the network connection, wherein the estimation is based on the associated packets;

determining, based on the feedback, that a set of packets having a size larger than the combined size of the associated packets would allow the second device to provide a more accurate estimation of the bandwidth; and increasing the threshold size in response to the determining.

2. The method of claim 1, wherein the associating the first set of packets with the second set of packets further comprises concatenating the first set of packets and the second set of packets in the combined stream.

3. The method of claim 1, wherein at least one packet in the first set of data packets precedes the packets in the second set of data packets in the associated data packets.

4. The method of claim 1, wherein the first set of packets comprises one packet.

5. The method of claim 1 further comprising preserving in the combined stream a time gap between two data packets from the first set of streams, wherein the preserving the time gap is performed by delaying data packets from the second set of streams that are to be associated with one of the two data packets from the first set of streams.

6. The method of claim 1, wherein the first set of streams comprises a stream of audio data packets.

7. The method of claim 1, wherein the second set of streams comprises a stream of video data packets.

8. A non-transitory computer readable medium of a first device, the non-transitory computer readable medium storing a computer program for combining a plurality of streams into one stream, the computer program comprising sets of instructions executable to cause a processor to:

combine different data streams of data packets into a single combined stream of data packets;

associate, in the combined stream, a first set of data packets from one or more streams with a second packet from a different stream such that the associated packets have a combined size that is at least a specified threshold size, wherein the associating comprises inserting into a packet in the first set of data packets information that identifies the second packet;

send the combined stream to a second device via a connection between the first and second devices;

receive from the second device feedback comprising an estimation of bandwidth of the connection, wherein the estimation is based on the associated packets in the combined stream;

determine, based on the feedback, that a set of packets having a size larger than the combined size of the associated packets in the combined stream would allow the second device to provide a more accurate estimation of the bandwidth; and increase the threshold size in response to the determining.

9. The non-transitory computer readable medium of claim 8, wherein the first and second devices are in a communication session, wherein associating is performed periodically throughout the communication session.

10. The non-transitory computer readable medium of claim 8, wherein the bandwidth of the connection is estimated by the second device based on arrival times of the associated packets at the second device.

11. The non-transitory computer readable medium of claim 8, wherein the estimation of the bandwidth is adjusted by the second device based on historic estimation of bandwidth.

12. A method of increasing size of packet sequence in a stream of data packets by a first device, the method comprising:

sending a stream of data packets that includes a first packet sequence to a second device, the first packet sequence comprising a set of concatenated packets;

receiving a feedback regarding network conditions from the second device, the feedback computed by the second device based on the stream of data packets;

based on the feedback, determining whether a packet sequence larger than the first packet sequence would allow the second device to compute more accurate feedback;

when determined that a packet sequence larger than the first packet sequence would allow the second device to compute more accurate feedback, determining whether to increase size of a later packet sequence, wherein the determining whether to increase the size of the later packet sequence comprises:

determining, based on the feedback, a threshold packet sequence size that would allow the second device to compute more accurate feedback;

evaluating the sizes of one or more subsequent packet sequences sent to the second device during a specified period of time after the receiving the feedback; and determining to increase the size of the later packet sequence if none of the evaluated sizes meet the determined threshold size; and when determined to increase, increase the size of the later packet sequence.

13. The method of claim 12, wherein the feedback comprises bandwidth measurement data that is provided by the second device.

14. The method of claim 12, wherein the increasing the size of the later packet sequence comprises including additional packets in the later packet sequence, wherein the additional packets are in excess of the number of packets included in the first packet sequence.

15. The method of claim 14, wherein the additional packets comprise filler data.

16. The method of claim 14, wherein the additional packets comprise non-filler data.

17. The method of claim 14, wherein the additional packets comprise a duplicate packet of another packet in the later packet sequence.

18. A non-transitory computer readable medium of a first device, the non-transitory computer readable medium storing a computer program for increasing size of packet sequence in a stream of data packets, the computer program comprising sets of instructions executable by a processor to:

send a stream of data packets that includes a first packet sequence to a second device, wherein the first packet sequence comprises a set of concatenated packets;
receive a feedback regarding network conditions from the second device, the feedback computed by the second device based on the stream of data packets;
determine, based on the feedback, whether a packet sequence larger than the first packet sequence would allow the second device to compute more accurate feedback;
when determined that a packet sequence larger than the first packet sequence would allow the second device to compute more accurate feedback, determine whether to increase size of a later packet sequence, wherein the determining whether to increase the size of the later packet sequence comprises:
  determining, based on the feedback, a threshold packet sequence size that would allow the second device to compute more accurate feedback;
  evaluating the sizes of one or more subsequent packet sequences sent to the second device during a specified period of time after the receiving the feedback; and
  determining to increase the size of the later packet sequence if none of the evaluated sizes meet the determined threshold size; and
when determined to increase, increase the size of the later packet sequence.

19. The non-transitory computer readable medium of claim 18, wherein the increasing the size of the later packet sequence comprises adjusting data processing in order to increase an amount of data in a packet in the later packet sequence.

20. The non-transitory computer readable medium of claim 18, wherein the determining whether to increase the size of a later packet sequence is further based on historic sizes of packet sequences in the stream of data packets.

21. The non-transitory computer readable medium of claim 18, wherein the determining whether to increase the size of the later packet sequence comprises determining whether the size of the later packet sequence meets the determined threshold size, wherein the size of the later packet sequence does not need to be incremented when the size of the later packet sequence meets the threshold size.

22. The non-transitory computer readable medium of claim 18, wherein the determining whether to increase the size of the later packet sequence further comprises adjusting the specified period of time based on the feedback and historic sizes of packet sequences in the stream of data packets.

* * * * *